(12) United States Patent
Tucholski

(10) Patent No.: US 8,268,475 B2
(45) Date of Patent: Sep. 18, 2012

(54) THIN PRINTABLE ELECTROCHEMICAL CELL AND METHODS OF MAKING THE SAME

(75) Inventor: Gary R. Tucholski, North Royalton, OH (US)

(73) Assignee: Blue Spark Technologies, Inc., Westlake, OH (US)

(*) Notice: Subject to any disclaimer, the term of this patent is extended or adjusted under 35 U.S.C. 154(b) by 0 days.

(21) Appl. No.: 13/223,845

(22) Filed: Sep. 1, 2011

(65) Prior Publication Data
US 2011/0311857 A1 Dec. 22, 2011

Related U.S. Application Data

(63) Continuation of application No. 11/378,520, filed on Mar. 17, 2006, now Pat. No. 8,029,927.

(60) Provisional application No. 60/664,135, filed on Mar. 22, 2005, provisional application No. 60/678,726, filed on May 6, 2005, provisional application No. 60/760,242, filed on Jan. 19, 2006.

(51) Int. Cl.
*H01M 6/46* (2006.01)
*H01M 2/08* (2006.01)
*H01M 4/62* (2006.01)
*H01M 2/16* (2006.01)
*H01M 4/50* (2010.01)
*H01M 4/66* (2006.01)

(52) U.S. Cl. ........ 429/162; 429/163; 429/185; 429/246; 429/217; 429/224; 429/245

(58) Field of Classification Search ................. 429/223, 429/322, 245, 127, 162, 163, 185, 246, 217, 429/224
See application file for complete search history.

(56) References Cited

U.S. PATENT DOCUMENTS

| | | | |
|---|---|---|---|
| 629,325 | A | 7/1899 | Ashley |
| 629,372 | A | 7/1899 | Kennedy |
| 2,154,312 | A | 4/1939 | MacCallum |
| 2,480,531 | A | 8/1949 | Wilke |
| 2,637,757 | A | 5/1953 | Wilke |

(Continued)

FOREIGN PATENT DOCUMENTS
DE 19943961 A1 6/2000
(Continued)

OTHER PUBLICATIONS

"Flexibles stay resilient", Lauren R. Hartman, Packagaing Digest, Mar. 1, 2005. Retrieved online on Feb. 28, 2012 from: http://www.packagingdigest.com/article/print/343757-Flexibles_stay_resilient.php.*

(Continued)

*Primary Examiner* — Jonathan Crepeau
*Assistant Examiner* — Kenneth Douyette
(74) *Attorney, Agent, or Firm* — Pearne & Gordon LLP

(57) ABSTRACT

A thin printed flexible electrochemical cell, and its method of manufacture, using a "picture frame" structure sealed, for example, with a high moisture and oxygen barrier polymer film and featuring, for example, a printed cathode deposited on an optional, highly conductive carbon printed cathode collector with a printed or a foil strip anode placed adjacent to the cathode. A viscous or gelled electrolyte is dispensed and/or printed in the cell, and a top laminate can then be sealed onto the picture frame. Such a construction could allow the entire cell to be made on a printing press, for example, as well as gives the opportunity to integrate the battery directly with an electronic application, for example.

21 Claims, 16 Drawing Sheets

U.S. PATENT DOCUMENTS

| | | |
|---|---|---|
| 2,688,649 A | 9/1954 | Bjorksten |
| 2,903,498 A | 9/1959 | Sindel et al. |
| 2,905,738 A | 9/1959 | Di Pasquale et al. |
| 3,006,980 A | 10/1961 | Story |
| 3,230,115 A | 1/1966 | Tamminen |
| 3,375,136 A | 3/1968 | Biggar |
| 3,655,449 A | 4/1972 | Yamamoto et al. |
| 3,770,504 A | 11/1973 | Bergum |
| 3,799,808 A | 3/1974 | Hancock |
| 3,847,669 A | 11/1974 | Paterniti |
| 3,901,732 A | 8/1975 | Kalnoki Kis et al. |
| 3,928,077 A | 12/1975 | Sperandio et al. |
| 3,954,506 A | 5/1976 | Sullivan |
| 3,967,292 A | 6/1976 | Delahunt |
| 3,980,497 A | 9/1976 | Gillman et al. |
| 3,988,168 A | 10/1976 | Bruneau |
| 3,993,508 A | 11/1976 | Erlichman |
| 4,001,467 A | 1/1977 | Sullivan |
| 4,006,036 A | 2/1977 | Charkoudian |
| 4,007,472 A | 2/1977 | Land |
| 4,028,479 A | 6/1977 | Fanciullo et al. |
| 4,042,760 A | 8/1977 | Land |
| 4,047,289 A | 9/1977 | Wolff |
| 4,060,669 A | 11/1977 | Fanciullo |
| 4,070,528 A | 1/1978 | Bergum et al. |
| 4,080,728 A | 3/1978 | Buckler |
| 4,086,399 A | 4/1978 | Hyland et al. |
| 4,086,400 A | 4/1978 | Hyland et al. |
| 4,098,965 A | 7/1978 | Kinsman |
| 4,105,815 A | 8/1978 | Buckler |
| 4,105,831 A | 8/1978 | Plasse |
| 4,112,205 A | 9/1978 | Charkoudian et al. |
| 4,118,860 A | 10/1978 | Buckler et al. |
| 4,119,770 A | 10/1978 | Land |
| 4,124,742 A | 11/1978 | Land et al. |
| 4,125,684 A | 11/1978 | Land |
| 4,125,685 A | 11/1978 | Bloom et al. |
| 4,125,686 A | 11/1978 | Kinsman |
| 4,136,236 A | 1/1979 | Ruetschi |
| 4,137,627 A | 2/1979 | Kinsman |
| 4,145,485 A | 3/1979 | Kinsman |
| 4,150,200 A | 4/1979 | Sullivan |
| 4,152,825 A | 5/1979 | Bruneau |
| 4,172,184 A | 10/1979 | Bloom et al. |
| 4,172,319 A | 10/1979 | Bloom et al. |
| 4,175,052 A | 11/1979 | Norteman, Jr. |
| 4,177,330 A | 12/1979 | Gordon et al. |
| 4,177,552 A | 12/1979 | Gordon et al. |
| 4,181,778 A | 1/1980 | Land |
| 4,185,144 A | 1/1980 | Ames et al. |
| 4,194,061 A | 3/1980 | Land et al. |
| 4,195,121 A | 3/1980 | Peterson |
| 4,204,036 A | 5/1980 | Cohen et al. |
| 4,232,099 A | 11/1980 | Sullivan |
| 4,242,424 A | 12/1980 | Buckler et al. |
| 4,254,191 A | 3/1981 | Kniazzeh |
| 4,256,813 A | 3/1981 | Kniazzeh |
| 4,287,274 A | 9/1981 | Ibbotson et al. |
| 4,345,954 A | 8/1982 | Panchu |
| 4,361,633 A | 11/1982 | Nel et al. |
| 4,389,470 A | 6/1983 | Plasse |
| 4,400,452 A | 8/1983 | Bruder |
| 4,427,748 A | 1/1984 | Land |
| 4,429,026 A | 1/1984 | Bruder |
| 4,455,358 A | 6/1984 | Graham et al. |
| 4,466,470 A | 8/1984 | Bruder |
| 4,477,544 A | 10/1984 | Bruder |
| 4,502,903 A | 3/1985 | Bruder |
| 4,505,996 A | 3/1985 | Simonton |
| 4,525,439 A | 6/1985 | Simonton |
| 4,532,193 A | 7/1985 | Kniazzeh et al. |
| 4,539,275 A | 9/1985 | Plasse |
| 4,554,226 A | 11/1985 | Simonton |
| 4,604,334 A | 8/1986 | Tarascon |
| 4,608,279 A | 8/1986 | Schumm, Jr. |
| 4,609,597 A | 9/1986 | Plasse |
| 4,621,035 A | 11/1986 | Bruder |
| 4,623,598 A | 11/1986 | Waki et al. |
| 4,664,993 A | 5/1987 | Sturgis et al. |
| 4,756,717 A | 7/1988 | Sturgis et al. |
| 4,889,777 A | 12/1989 | Akuto |
| 4,916,035 A | 4/1990 | Yamashita et al. |
| 4,977,046 A | 12/1990 | Bleszinski, Jr. et al. |
| 4,997,732 A | 3/1991 | Austin et al. |
| 5,035,965 A | 7/1991 | Sangyoji et al. |
| 5,055,968 A | 10/1991 | Nishi et al. |
| 5,110,696 A | 5/1992 | Shokoohi et al. |
| 5,116,701 A | 5/1992 | Kalisz |
| 5,120,785 A | 6/1992 | Walker et al. |
| 5,217,828 A | 6/1993 | Sangyoji et al. |
| 5,259,891 A | 11/1993 | Matsuyama et al. |
| 5,326,652 A | 7/1994 | Lake |
| 5,330,860 A | 7/1994 | Grot et al. |
| 5,338,625 A * | 8/1994 | Bates et al. .................. 429/322 |
| 5,350,645 A | 9/1994 | Lake et al. |
| 5,401,590 A | 3/1995 | Chalilpoyil et al. |
| 5,415,888 A | 5/1995 | Banerjee et al. |
| 5,424,151 A | 6/1995 | Koksbang et al. |
| 5,445,856 A | 8/1995 | Chaloner-Gill |
| 5,455,127 A | 10/1995 | Olsen et al. |
| 5,470,357 A | 11/1995 | Schmutz et al. |
| 5,514,492 A | 5/1996 | Marincic et al. |
| 5,547,911 A | 8/1996 | Grot |
| 5,565,143 A | 10/1996 | Chan |
| 5,578,390 A | 11/1996 | Hughen |
| 5,587,254 A | 12/1996 | Kojima et al. |
| 5,620,580 A | 4/1997 | Okabe et al. |
| 5,622,652 A | 4/1997 | Kucherovsky et al. |
| 5,624,468 A | 4/1997 | Lake |
| 5,637,418 A | 6/1997 | Brown et al. |
| 5,652,043 A | 7/1997 | Nitzan |
| 5,658,684 A | 8/1997 | Lake |
| 5,728,181 A | 3/1998 | Jung et al. |
| 5,735,912 A | 4/1998 | Lake |
| 5,735,914 A | 4/1998 | Lake |
| 5,747,190 A | 5/1998 | Lake |
| 5,747,191 A | 5/1998 | Lake |
| 5,759,215 A | 6/1998 | Masuda |
| 5,779,839 A | 7/1998 | Tuttle et al. |
| 5,811,204 A | 9/1998 | Nitzan |
| 5,865,859 A | 2/1999 | Lake |
| 5,897,522 A | 4/1999 | Nitzan |
| 5,906,661 A | 5/1999 | Lake |
| 5,930,023 A | 7/1999 | Mitchell, Jr. et al. |
| 5,941,844 A | 8/1999 | Eckenhoff |
| 6,025,089 A | 2/2000 | Lake |
| 6,030,423 A | 2/2000 | Lake |
| 6,030,721 A | 2/2000 | Lake |
| 6,045,942 A | 4/2000 | Miekka et al. |
| 6,078,842 A | 6/2000 | Gross et al. |
| 6,084,380 A | 7/2000 | Burton |
| RE36,843 E | 8/2000 | Lake |
| 6,136,468 A | 10/2000 | Mitchell et al. |
| 6,157,858 A | 12/2000 | Gross et al. |
| 6,186,982 B1 | 2/2001 | Gross et al. |
| 6,187,475 B1 | 2/2001 | Oh et al. |
| 6,200,704 B1 | 3/2001 | Katz et al. |
| 6,208,524 B1 | 3/2001 | Tuttle |
| 6,235,422 B1 | 5/2001 | Kaplan et al. |
| 6,243,192 B1 | 6/2001 | Mitchell, Jr. et al. |
| 6,273,904 B1 | 8/2001 | Chen et al. |
| 6,277,520 B1 | 8/2001 | Moutsios et al. |
| 6,317,630 B1 | 11/2001 | Gross et al. |
| 6,369,793 B1 | 4/2002 | Parker |
| 6,379,835 B1 | 4/2002 | Kucherovsky et al. |
| 6,395,043 B1 | 5/2002 | Shadle et al. |
| 6,421,561 B1 | 7/2002 | Morris |
| 6,458,234 B1 | 10/2002 | Lake et al. |
| 6,503,658 B1 | 1/2003 | Klein et al. |
| 6,569,572 B1 | 5/2003 | Ochiai et al. |
| 6,576,364 B1 | 6/2003 | Mitchell, Jr. et al. |
| 6,643,532 B2 | 11/2003 | Axelgaard |
| 6,653,014 B2 | 11/2003 | Anderson et al. |
| 6,664,006 B1 | 12/2003 | Munshi |
| 6,676,021 B1 | 1/2004 | Luski et al. |
| 6,676,714 B2 | 1/2004 | Langan |
| 6,697,694 B2 | 2/2004 | Mogensen |

| | | |
|---|---|---|
| 6,708,050 B2 | 3/2004 | Carim |
| 6,709,778 B2 | 3/2004 | Johnson |
| 6,729,025 B2 | 5/2004 | Farrell et al. |
| 6,740,451 B2 | 5/2004 | Christian et al. |
| 6,743,546 B1 | 6/2004 | Kaneda et al. |
| 6,752,842 B2 | 6/2004 | Luski et al. |
| 6,757,560 B1 | 6/2004 | Fischer et al. |
| 6,816,125 B2 | 11/2004 | Kuhns et al. |
| 6,836,215 B1 | 12/2004 | Laurash et al. |
| 6,855,441 B1 | 2/2005 | Levanon |
| 6,884,546 B1 | 4/2005 | Fujita et al. |
| 6,888,502 B2 | 5/2005 | Beigel et al. |
| 6,899,976 B2 | 5/2005 | Larson et al. |
| 6,915,159 B1 | 7/2005 | Kuribayashi et al. |
| 7,017,822 B2 | 3/2006 | Aisenbrey |
| 7,022,431 B2 | 4/2006 | Shchori et al. |
| 7,031,768 B2 | 4/2006 | Anderson et al. |
| 7,043,297 B2 | 5/2006 | Keusch et al. |
| 7,049,962 B2 | 5/2006 | Atherton et al. |
| 7,224,280 B2 | 5/2007 | Ferguson et al. |
| RE39,676 E | 6/2007 | Nitzan |
| 7,238,196 B2 | 7/2007 | Wibaux |
| 7,244,326 B2 | 7/2007 | Craig et al. |
| 7,294,209 B2 | 11/2007 | Shakespeare |
| 7,320,845 B2 | 1/2008 | Zucker |
| 7,335,441 B2 | 2/2008 | Luski et al. |
| 7,340,297 B2 | 3/2008 | Tamarkin et al. |
| 7,340,310 B2 | 3/2008 | Nitzan et al. |
| 7,348,096 B2 | 3/2008 | Schubert et al. |
| 7,364,896 B2 | 4/2008 | Schembri |
| 7,368,191 B2 | 5/2008 | Andelman et al. |
| 7,383,083 B2 | 6/2008 | Fischer et al. |
| 7,394,382 B2 | 7/2008 | Nitzan et al. |
| 7,483,738 B2 | 1/2009 | Tamarkin et al. |
| 7,491,465 B2 | 2/2009 | Nitzan et al. |
| 7,501,208 B2 | 3/2009 | Feddrix et al. |
| 7,603,144 B2 | 10/2009 | Jenson et al. |
| 7,625,664 B2 | 12/2009 | Schubert et al. |
| 7,643,874 B2 | 1/2010 | Nitzan et al. |
| 7,652,188 B2 | 1/2010 | Levanon et al. |
| 7,727,290 B2 | 6/2010 | Zhang et al. |
| 2002/0086215 A1 | 7/2002 | Tamura et al. |
| 2002/0095780 A1 | 7/2002 | Shadle et al. |
| 2002/0110733 A1 | 8/2002 | Johnson |
| 2002/0182485 A1 | 12/2002 | Anderson et al. |
| 2002/0192542 A1 | 12/2002 | Luski et al. |
| 2003/0014014 A1 | 1/2003 | Nitzan |
| 2003/0059673 A1 | 3/2003 | Langan et al. |
| 2003/0082437 A1 | 5/2003 | Sotomura |
| 2003/0165744 A1 | 9/2003 | Schubert et al. |
| 2003/0187338 A1 | 10/2003 | Say et al. |
| 2003/0219648 A1 | 11/2003 | Zucker |
| 2003/0232248 A1* | 12/2003 | Iwamoto et al. ............ 429/233 |
| 2004/0001998 A1 | 1/2004 | Hopkins et al. |
| 2004/0009398 A1 | 1/2004 | Dorfman |
| 2004/0018422 A1 | 1/2004 | Islam et al. |
| 2004/0170893 A1 | 9/2004 | Nakaishi et al. |
| 2004/0209160 A1 | 10/2004 | Luski et al. |
| 2004/0217865 A1 | 11/2004 | Turner |
| 2004/0267189 A1 | 12/2004 | Mavor et al. |
| 2004/0267190 A1 | 12/2004 | Tamarkin et al. |
| 2004/0267283 A1 | 12/2004 | Mavor et al. |
| 2005/0013783 A1 | 1/2005 | Perricone |
| 2005/0038473 A1 | 2/2005 | Tamarkin et al. |
| 2005/0085751 A1 | 4/2005 | Daskal et al. |
| 2005/0147880 A1 | 7/2005 | Takahashi et al. |
| 2005/0194454 A1 | 9/2005 | Ferber et al. |
| 2005/0260492 A1 | 11/2005 | Tucholski et al. |
| 2006/0001528 A1 | 1/2006 | Nitzan et al. |
| 2006/0007049 A1 | 1/2006 | Nitzan et al. |
| 2006/0012464 A1 | 1/2006 | Nitzan et al. |
| 2006/0131616 A1 | 6/2006 | Devaney et al. |
| 2006/0159899 A1 | 7/2006 | Edwards et al. |
| 2006/0211936 A1 | 9/2006 | Hu et al. |
| 2006/0253061 A1 | 11/2006 | Anderson et al. |
| 2006/0264804 A1 | 11/2006 | Karmon et al. |
| 2007/0007661 A1 | 1/2007 | Burgess et al. |
| 2007/0011870 A1 | 1/2007 | Lerch et al. |
| 2007/0016277 A1 | 1/2007 | Karat et al. |
| 2007/0024425 A1 | 2/2007 | Nitzan et al. |
| 2007/0060862 A1 | 3/2007 | Sun et al. |
| 2007/0066930 A1 | 3/2007 | Tanioka et al. |
| 2007/0243459 A1 | 10/2007 | Jenson et al. |
| 2008/0007409 A1 | 1/2008 | Ferry et al. |
| 2008/0021436 A1 | 1/2008 | Wolpert et al. |
| 2008/0091095 A1 | 4/2008 | Heller et al. |
| 2008/0174380 A1 | 7/2008 | Nitzan et al. |
| 2008/0218345 A1 | 9/2008 | Nitzan et al. |
| 2008/0272890 A1 | 11/2008 | Nitzan et al. |
| 2010/0209756 A1 | 8/2010 | Bailey et al. |

FOREIGN PATENT DOCUMENTS

| | | |
|---|---|---|
| EP | 0678927 A1 | 10/1995 |
| EP | 0862227 A1 | 9/1998 |
| EP | 1026767 A1 | 8/2000 |
| EP | 1096589 A1 | 5/2001 |
| EP | 1107336 A2 | 6/2001 |
| JP | 55-133770 A | 10/1980 |
| JP | 58-206048 A | 12/1983 |
| JP | 59-228353 A | 12/1984 |
| JP | 61-55866 A | 3/1986 |
| JP | 61-64077 A | 4/1986 |
| JP | 62-126557 A | 6/1987 |
| JP | 62-165875 A | 7/1987 |
| JP | 62-165876 A | 7/1987 |
| JP | 62-285954 A | 12/1987 |
| JP | 63-081762 | 4/1988 |
| JP | 64-24364 A | 1/1989 |
| JP | H02-273464 | 11/1990 |
| JP | H04-276665 | 10/1992 |
| JP | 2000-164033 A | 6/2000 |
| JP | 2000-229128 A | 8/2000 |
| JP | 2000-319381 A | 11/2000 |
| JP | 2001-23695 A | 1/2001 |
| JP | 2001-521676 A | 11/2001 |
| JP | 2003-151634 A | 5/2003 |
| JP | 2003-282148 A | 10/2003 |
| JP | 2004-336240 A | 11/2004 |
| TW | 540185 B | 7/2003 |
| WO | 96/38867 A1 | 12/1996 |
| WO | 97/17735 A1 | 5/1997 |
| WO | 98/22987 A2 | 5/1998 |
| WO | 98/48469 A1 | 10/1998 |
| WO | 00/36672 A1 | 6/2000 |
| WO | 03/069700 A2 | 8/2003 |

OTHER PUBLICATIONS

Acheson Colloids Company, "Sales Information Bulletin," Port Huron, MI, Nov. 24, 2009.

Acheson Industries, "Acheson Electrical Materials," Henkel Corporation, One Henkel Way, Rocky Hill, CT 06067, retrieved Nov. 24, 2009 from www.achesonindustries.com.

Advanced Coatings and Chemicals, "Technical Data Sheet," Temple City, CA, Nov. 24, 2009.

Linden, D., Handbook of Batteries and Fuel Cells, McGraw-Hill Book Company, 1984, pp. 5-5 to 5-7.

Linden, D., Handbook of Batteries Second Edition, McGraw-Hill, Inc., 1995, pp. 8.8 to 8.9.

Omnexus Adhesives & Sealant Solutions, "Ethylene Vinyl Acetate (EVA) and Other Hot Melts," from http://www.omnexus4adhesives.com/bc/construction-channel/index.aspx?id=ethylene, Aug. 11, 2010.

International Search Report and Written Opinion issued Dec. 31, 2008 in PCT Application Serial No. PCT/U2008/070500.

International Search Report and Written Opinion issued Jan. 30, 2009 in PCT Application Serial No. PCT/US2008/071549.

International Search Report and Written Opinion issued Aug. 6, 2009 in PCT Application Serial No. PCT/US2008/087424.

Prosecution history for U.S. Appl. No. 11/110,202.

Prosecution history for U.S. Appl. No. 11/379,816.

Prosecution history for U.S. Appl. No. 12/669,067.

Prosecution history for U.S. Appl. No. 12/669,068.

Extended European search report issued Nov. 25, 2011 in related European application No. 06739079.9.

* cited by examiner

SECTION "A-A"

SECTION "A-A"

SECTION "B-B"

SECTION "C-C"

SECTION "A-A"

SECTION "A-A"

SECTION "B-B"

SECTION "C-C"

SECTION "A-A"

SECTION "B-B"

SECTION "C-C"

SECTION "D-D"

SECTION "E-E"

THIN PRINTABLE ELECTROCHEMICAL CELL AND METHODS OF MAKING THE SAME

CROSS-REFERENCES TO RELATED APPLICATIONS

This application is a continuation of application Ser. No. 11/378,520 filed on Mar. 17, 2006, now U.S. Pat. No. 8,029,927 which application claims the benefit of provisional application Ser. Nos. 60/664,135, filed on Mar. 22, 2005; 60/678,726 filed on May 6, 2005; and 60/760,242 filed on Jan. 19, 2006; each of which is incorporated herein by reference in their entirety.

BACKGROUND OF THE INVENTION

This application relates generally to an electrochemical cell or battery, and more specifically relates to a flat, thin, electrochemical cell utilizing a picture frame feature and its method of manufacture, including printing methods. Even more specifically, this invention relates to a thin printable cell comprising two electrodes, a separator, electrolyte, and a cell frame between two laminated film layers, and its method of manufacture.

For the past one hundred years or so, scientists have been making Carbon/Zinc portable power sources for various applications. In the early days of portable power, these power sources were very large compared to today's standards. For example, the very popular "Ignitor Cell" made by Eveready was about 3" diameter and about 9" tall and was used in many applications such as radios, buzzers, Xmas lighting, etc. These large cells, as well as some smaller versions, such as the famous Eveready #6 (about 2" dia.×6" tall) and the smallest unit cell of the day, the #950 (D size), were commonly made into battery packs with voltages exceeding 40 volts in some applications. These were similar in size, and even larger, than today's car batteries, for uses in lighting devices, radios and car ignition systems. In the mid 1900's, with the advent of advanced electronics such as the transistor, the electrical requirements for portable power sources were drastically reduced. Consequently, cell sizes could also be reduced to include C's, AA's, and AAA's, and even small button cells. This power reduction has continued into the twenty-first century, where applications such as smart labels, smart credit cards, sensors, data loggers, novelty devices such as greeting cards and badges, etc., now require a maximum current of several milliamperes, with many applications requiring as little as a few microamperes at about 1.5-3.0 volts. These applications also have the requirement that the power sources be flat and very thin to maintain their low profiles and portability.

In the past twenty-five years, various approaches for making thin, flat cells and batteries were attempted by numerous scientists and corporations. These include the widely known instant film battery pack developed by Polaroid. This battery pack was used in each package of Polaroid instant film. This allowed Polaroid to have a fresh battery in the camera each time the user placed a new pack of film in the camera. This high cost battery with multiple layers and a metal foil laminate package is a high voltage, high current battery, capable of igniting flash bulbs and powering motors, for example, and is not a realistic competitor of the new thin low cost batteries that are needed. In addition to Polaroid, others have tried to develop thin batteries in various electrochemical systems.

Co-pending application Ser. No. 11/110,202, filed on Apr. 20, 2005, and incorporated herein by reference, discusses a new design and method of manufacture of a flat cell and battery.

With the growing market needs for low cost, low capacity thin flat cells, it would be beneficial to produce a thin, flat, printable flexible cell that is versatile and inexpensive to mass-produce. Printable, disposable thin cells that are well suited for low-power and high-production volume applications would be useful, especially if they offer adequate voltage, sufficient capacity, and low-cost solutions. Conventional low-profile batteries typically have few of these attributes, if any.

Furthermore, a previously described construction in an earlier application, which is assembled using a horizontal pouch filler, (see application Ser. No. 11/110,202, incorporated by reference), may lead to some possible air entrapment, and thus might not be as flat and thin as might be desirable for some applications. Also, such cells disclosed therein may be vulnerable to large compression forces. In addition, it would be useful to avoid the need for the paper layer disclosed in the construction of some embodiments of that application, and furthermore, the liquid electrolyte of that application could prove difficult to handle and may not be printable. It might also be useful to eliminate the folding step disclosed in that application, as well. In addition, a cell that could be integrated into the application it is powering, during manufacture, would be useful as well.

SUMMARY OF THE INVENTION

Provided are a plurality of embodiments of a device including one or more electrochemical cells acting as a battery power source. These embodiments include, but are not limited to a device comprising an electrochemical cell for generating an electrical current, with the cell of this device including a first substrate layer of a substantially uniform thickness and a second substrate layer of a substantially uniform thickness. Also included is a cathode layer provided on at least one of the first substrate layer and the second substrate layer, and an anode layer provided on at least one of the first substrate layer and the second substrate layer. Further included is an electrolyte layer in contact with the cathode layer and also in contact with the anode layer, and a frame of substantially uniform thickness provided substantially around a perimeter of the cell and connecting the lower substrate layer to the upper substrate layer.

The frame is substantially thicker than each one of the cathode layer, the anode layer, and the electrolyte layer, and the device is substantially flat and of a thickness of about that of the thickness of the frame added to the thickness of each of the substrate layers.

Also provided is a substantially flat device comprising a flat electrochemical cell for generating an electrical current, with the cell including a first substrate layer comprised of a plurality of laminated layers, and a second substrate layer comprised of the plurality of laminated layers. Also included is a cathode layer provided on at least one of the first substrate layer and the second substrate layer, and an anode layer provided on at least one of the first substrate layer and the second substrate layer. Further included is an electrolyte layer comprising a viscous liquid in contact with the cathode layer and also in contact with the anode layer, and a frame connecting the lower substrate layer to the upper substrate layer to form an inner space containing the electrolyte, with the frame also containing at least a major portion of the cathode layer and at least a major portion of the anode layer within the inner space. At least one of the anode layer and the cathode layer are comprised of a cured or dried ink.

Further provided is a battery comprising at least one cell as described above, for example, or with the at least one cell including a first substrate layer comprised of a plurality of laminated layers including at least a structural layer, an oxide barrier layer, and a sealing layer. The cell also including a second substrate layer comprised of the plurality of laminated layers. The cell further including a cathode collector layer provided on at least one of the first substrate layer and the second substrate layer, a cathode layer provided on the cathode collector layer, and an anode layer provided on at least one of the first substrate layer and the second substrate layer or provided on an anode collector layer provided on at least one of the first substrate layer and the second substrate layer. The cell also including an electrolyte layer including an electrolyte in contact with the anode layer and the cathode layer, and a frame around an inner perimeter of the cell for connecting the lower substrate layer to the upper substrate layer to form an inner space for containing the electrolyte within the inner space along with at least a portion of the anode layer and at least a portion of the cathode layer. The inner space of the cell is substantially sealed off from an exterior of the cell.

Still further provided is a method of manufacturing a device including an electrochemical cell. The method comprising the steps of forming the cell, with the forming including the steps of: providing a first substrate layer and a second substrate layer both including a laminated web having a plurality of layers. The forming also including the step of printing one of a cathode layer and an anode layer on one of the first substrate layer and the second substrate layer, and providing, by printing or some other process, the other of the cathode layer and the anode layer on one of the first substrate layer and the second substrate layer. The forming also including the steps of providing a frame on one of the first substrate layer and the second substrate layer, printing an electrolyte layer comprising a viscous liquid; and connecting the other of the first substrate layer and the second substrate layer to the frame to form an inner space containing the cathode layer, the anode layer, and the electrolyte layer. The device can be formed into a substantially flat shape of a thickness about that of the thickness of the frame added to the thickness of each of the substrate layers.

Also provided are additional embodiments, some, but not all of which, are described herein below.

DETAILED DESCRIPTION OF THE PREFERRED EMBODIMENTS OF THE INVENTION

Figure 1:
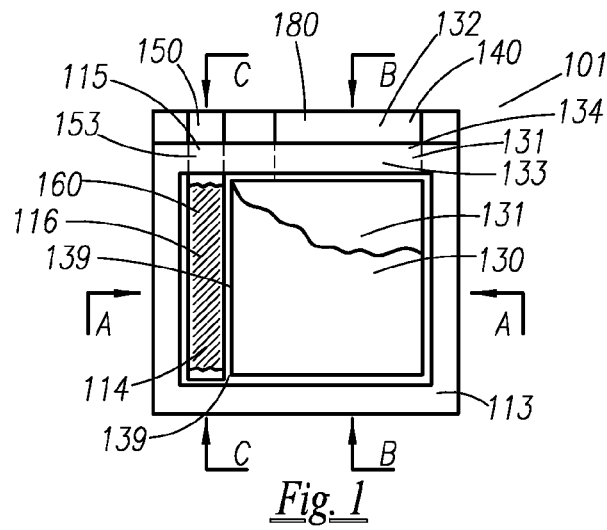
FIG. 1 shows a plan view of an embodiment of a unit cell 101.

As used herein, unless otherwise explicitly indicated, all percentages are percentages by weight. Also, as used herein, when a range such as "5-25" (or "about 5-25") is given, this means, for at least one embodiment, at least about 5 and, separately and independently, not more than about 25, and unless otherwise indicated, ranges are not to be strictly construed, but are given as acceptable examples. Also herein, a parenthetical range following a listed or preferred value indicates a broader range for that value according to additional embodiments of the invention.

The present invention relates to thin, printed electrochemical cells and/or batteries comprising a plurality of such cells. Such cells each typically include at least a first electrode including a first electrochemical layer (e.g., a cathode), a second electrode including a second electrochemical layer (e.g., an anode), and an electrolyte that interacts with the electrodes to create an electrical current. All of the first and second electrodes and the electrolyte are typically contained within some structure which provides an external electrical access to the electrodes for providing an electrical current supply to some device.

One method of mass-producing such cells includes depositing aqueous and/or non-aqueous solvent inks and/or other coatings in a pattern on a special substrate, such as a laminated polymeric film layer, for example. The depositing can be by means of, for example, printing electrochemical inks and/or laminating a metallic foil, such as a zinc foil, for example, on one or more high-speed web printing presses, especially if the required volumes are very high. If volumes are lower, say in the quantities of only about several million or less, then slower methods such as web printing with flat bed screens could be appropriate. If the volumes are even lower, such as hundreds or thousands, then a sheet-fed flat bed printing press may be utilized, for example.

After the inks are printed and/or the solids have been properly placed, the cells can be completed (e.g., sealed, die cut, stacked and/or perforated and wound into a roll, or stacked if sheets are used on a printing press). This cell manufacturing process can also be utilized for integrating one or more individual cells with an actual electronic application, or into batteries comprising multiple cells connected in series or parallel, or some combination of the two. Examples of such devices and corresponding processes will be described later, but many additional embodiments are also contemplated.

As discussed above, the invention may be described as a printed, flexible, and thin electrochemical cell. Such a cell can include, for example, a lower film substrate that can utilize a special polymer laminate that has special features, possibly including, for example, a high moisture barrier layer in the center that is surrounded by polymer films on both sides. Furthermore, one or both outside surfaces can be made to be print receptive for printing information, logos, instructions, identifications, serial numbers, graphics, or other information or images, as desired.

Depending on which construction of this invention is used, the inner ply of the substrate could also feature a heat-sealing layer that might be co-extruded on the side opposite the barrier coating.

In addition, a portion of the inner surface of a lower substrate layer of a cell of at least some embodiments could utilize a cathode current collector, such as carbon, for example, printed or coated or otherwise applied on a portion of the film substrate. At an outside contact area of this collector can also be printed a layer of a relatively highly conductive ink, such as silver, nickel, or tin, for example, to improve the conductivity to the application connection, if desired. However, if the battery application is used for relatively low current requirements, then the higher conductive layer material, or even the current collector, may not be required for one or both electrodes.

For at least some embodiments, a water-based ink electrochemical layer is printed as the cathode. Such a cathode layer can include, for example, manganese dioxide ($MnO_2$), carbon, and a polymer binder. Other formulations for the cathode layer can also be utilized with or without any of these materials. If a cathode collector layer is used, the cathode electrochemical layer will be printed on at least a portion of the cathode current collector, which is printed or otherwise applied first to the substrate.

In some embodiments, adjacent to the cathode collector, at a spacing of about 0.050", can be placed a narrow strip of zinc foil as the anode. Other anode compositions are also possible, such as an ink layer including zinc or some other proper material, for example.

Prior to this anode placement, in an off-line operation, a dry-film adhesive layer, possibly using a release liner, can be applied. The zinc foil can then be laminated to the dry film adhesive.

Optionally, printed over one or both the anode and cathode, is a starch ink or similar material. The starch ink can act as an electrolyte absorber to keep the electrodes "wet" after an aqueous electrolyte solution is added to the cell. This starch ink could also include the electrolyte salts and the required water for the cell reaction.

For some embodiments, after the two electrodes are in place, with or without the starch layer(s), a cell "picture frame" can be added. This could be done using a number of different methods. One method is to print this cell picture frame with a dielectric ink, for example. Another method is to utilize a polymer sheet, stamped, die cut, laser cut or similar methods to form the appropriate "pockets" (inner space or spaces) to house materials of each unit cell.

To ensure good sealing of the picture frame to the substrates, and to provide good sealing of the contact feed-throughs (providing an electrical pathway from the cell inside to the cell exterior), a sealing or caulking adhesive could be printed on the substrate, such as in the same pattern as the cell frame, for example, prior to the frame being printed or prior to the polymer sheets being inserted, for example.

This sealing or caulking material could be pressure sensitive, and/or heat sensitive, for example, such as Acheson Colloids' PM040, for example, or any other type of material that would facilitate sealing to both surfaces.

After the dielectric picture frame is printed and dried and/or cured, a heat sensitive sealing adhesive can be printed on top of the frame to allow good sealing of the top substrate to the cell frame. This cell picture frame could also comprise a polymer film of about 0.015" thick (range of about 0.003"-0.050") that is pre-punched and then laminated in registration to match the preprinted caulking adhesive layer described above.

Zinc chloride ($ZnCl_2$) can be chosen as the electrolyte, for at least some embodiments, in the concentration range of about 18%-45% by weight, for example. The electrolyte can be added, for example, to the open cell. To facilitate processing on the line, this electrolyte, or a different electrolyte, could be thickened with, for example, CMC at about a level of about 0.6 wgt % (range of about 0.05%-1.0%).

Other useful electrolyte formulations, such as ammonium chloride ($NH_4Cl$), mixtures of zinc chloride ($ZnCl_2$) and ammonium chloride ($NH_4Cl$), zinc acetate ($Zn(C_2H_2O_2)$), zinc bromide ($ZnBr_2$), zinc fluoride ($ZnF_2$), zinc tartrate ($ZnC_4H_4O_6 \cdot H_2O$), zinc per-chlorate $Z_n(ClO_4)_2 \cdot 6H_2O$), potassium hydroxide, sodium hydroxide, or organics, for example, could also be used.

Zinc chloride may be the electrolyte of choice, providing excellent electrical performance for ordinary environmental conditions normally encountered. Likewise, any of the above mentioned alternative electrolytes, among others, could be used in concentrations (by weight), for example, within the range of about 18%-45%, with the range of about 25%-35% used for at least some other embodiments. Such compositions could also provide acceptable performance under ordinary environmental conditions.

The use of electrolytes other than of zinc chloride can provide improved cell/battery electrical performance under some differing environmental conditions. For example, about 32% by weight zinc acetate (F.P.—freezing point—about 28° C.) exhibits a lower freezing point than about 32% by weight zinc chloride (F.P. about −23° C.). Both of these solutions exhibit a lower freezing point than of about 27% zinc chloride (F.P. about −18° C.). Other zinc acetate concentrations, e.g. about 18-45 or about 25-35 weight percent, also exhibit reduced freezing points about −18° C.

Use of such electrolyte formulations as substitutes for zinc chloride, or in various mixtures used in cells, can allow for improved performance at low temperatures. For example, it has been found that the use of an about 32% zinc acetate electrolyte substantially improves low temperature (i.e. below about −20° C.) performance of a voltaic cell. This type of electrochemical cell performance improvement at low temperature can be utilized in the growing business of battery assisted RFID tags, for example, and/or other transient (transportable) electrically operated devices, such as smart active labels and temperature tags, for example, which may be used in cold environments.

For example, many products that are shipped today, such as food products pharmaceuticals, blood, etc, may require low temperature storage and shipping conditions, or even low temperature operation. To ensure safe shipment of such goods, these items can be tracked with active RFID tags and/or sensors. These tags and/or labels might require electrochemical cells and/or batteries to operate effectively at temperatures at, or even below, −20° C., such as at about −23° C., about −27° C., or even at about −30° C. or less.

When zinc acetate is used to achieve improved low temperature performance for low temperature applications, the zinc acetate concentration in the range of about 31-33, is often acceptable, although ranges of about 30-34, about 28-36, about 26-38, and even about 25-40, weight percent, could also be utilized.

In at least one embodiment, the construction of the printed starch layer with the addition of the aqueous electrolyte could be replaced, for example, by a printable viscous liquid (which could include a gel, or some other viscous material) that effectively covers at least a portion of each electrode. One such printable gel is described in United States Patent Publication 2003/0165744A1, published on Sep. 4, 2003, and incorporated herein by reference. These viscous formulations could, for example, utilize the electrolyte formulas and concentrations previously discussed.

The upper substrate of a cell package could utilize a special laminated polymeric film, which has an edge that extends beyond the internal cell/battery components onto the cell frame. The upper layer is sealed around the edges of the cell frame by means of a pressure sensitive adhesive (PSA), and/or with the heat sensitive sealing adhesive that was previously printed, thus confining the internal components within the cell frame.

The above-described constructions can be wet cell constructions; however, using a similar cell construction, the present invention could be also be made into a reserve cell construction, which has the benefit of providing extended shelf life prior to the application of a liquid. The printable, flexible, zinc chloride thin cell can be made environmentally friendly. Such a construction could be utilized which does not require the use of harmful components, such as mercury or cadmium, for example. Old and/or depleted cells of this design could thus be disposed using regular waste removal procedures.

The devices for which this technology can be used are extensive. Devices that require relatively low power or a limited life of one to two years could function utilizing a thin cell/battery according to the invention. The cell of the invention, as explained in the above paragraphs and below, can often be inexpensively mass-produced so that it can be used in a disposable product, for example. The low cost allows for applications that previously were not cost effective.

The electrochemical cell/battery according to the invention might have one or more of the following advantages:
Relatively thin;
Flat, and of relatively uniform thickness, where the edges are of about the same thickness as the center;
Flexible;
Many geometric shapes are possible;
Sealed container;
Simple construction;
Designed for high speed and high volume production;
Low cost;
Reliable performance at many temperatures;
Good low temperature performance;
Disposable and environmentally friendly;
Both cell contacts provided on the same surface;
Ease of assembly into an application; and
Capable of being easily integrated in a continuous process at the same time that the electronic application is being made.

The above was a general description of various cell constructions according to some embodiments of the invention, and further details utilizing drawings follow below. Cell and battery production processes for cell printing and assembly also will be described as well.

FIGS. 1-4 show two embodiments of a completed unit cell 101 in plan and sectional views. The cell 101 in this description is assumed to be a hand-made embodiment for discussion purposes, so that the cell construction parts and details could be simplified and made easier to describe, and so that they could be thoroughly explained while avoiding the processing details. Later in this discussion of the invention, after the simplified cell construction had been provided, some modifications of the construction (materials and processing methods) details will be presented to provide for embodiments that can be made on a high-speed printing press, for example.

The cell 101 of FIGS. 1-4 includes a top laminated film substrate (layer) 112, a lower laminated film substrate (layer) 111, with an extended area 180 which has a positive contact 140 and negative contact 150. The cell 101, examples of which are shown in FIGS. 1 through 4, is comprised of electrode layer 130 (cathode) and an electrode layer 115 (anode) each comprised of an electrochemical layer of a different composition that can interact in an electrochemical manner with an electrolyte to create an electrical current. For clarity purposes, cell 101 in FIG. 1 is shown without the top laminate 112.

Prior to applying the cathode layer 130, a cathode collector 131 of highly conductive carbon can be printed on the lower laminated substrate 111. In at least one embodiment, this cathode collector has substantially the combined shape and size of the cathode layer 130, and contact extension 134, although size differences can also be utilized. In some embodiments, the collector may not be necessary, especially where the cathode layer is of a higher conductivity.

Figure 4:
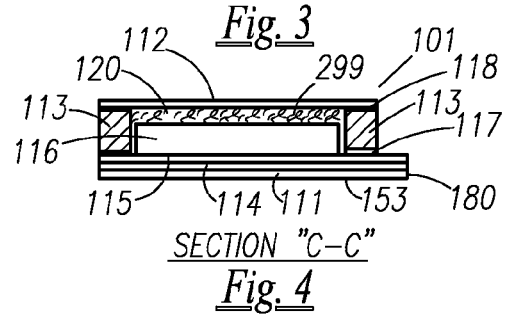
FIG. 4 shows a cross section view of the unit cell taken through the entire length of a second electrode.

In at least one embodiment, on the large area part of the cathode collector 131, the cathode layer 130 is printed using an ink comprising Manganese dioxide, a conductor such as carbon (e.g., graphite) for example, a binder, and water. The anode layer assembly 160, as shown in FIG. 4, is inserted as a zinc foil anode layer 115 and a double sided dry film adhesive 114 laminate on the lower laminated film substrate 111. This assembly can be placed about 0.050" (about 0.010"-

0.100") away from the cathode 130 for at least one embodiment (with other distances possibly utilized for some other embodiments).

Figure 2:
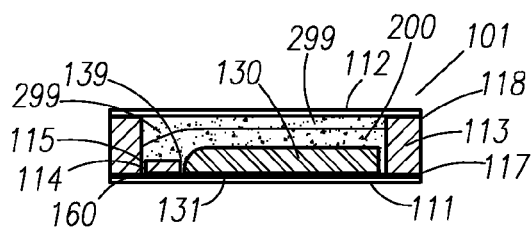
FIG. 2 shows a cross section view of the unit cell taken through electrode areas.
Figure 2A:
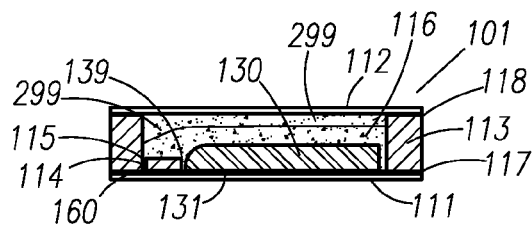
FIG. 2A shows a cross section view of the unit cell taken through electrode areas with an alternate construction from FIG. 2.
Figure 3:
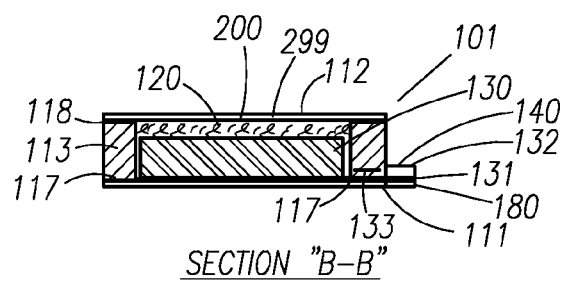
FIG. 3 shows a cross section view of the unit cell taken through the entire length of a first electrode.

After the anode assembly is inserted, an aqueous starch coating layer 116 could be printed over the anode layer, and in some constructions this starch layer could also be printed over the cathode layers (not shown in FIGS. 1, and 2), as well in the gap 139 shown in FIG. 2A, which separates the two electrode layers.

After the electrode layers (anode assembly 160 and cathode layer 130) are in place, along with the optional starch coating 116, if present, a "picture frame" 113 is placed around the electrodes. This picture frame could be made with a number of different materials and produced by a number of different methods for a variety of embodiments. In the simplified construction being discussed here, the picture frame 113 could comprise a die cut polymer laminate sheet, such as a polyester or polyvinyl chloride (PVC) etc, in the middle and having two outside layers of pressure sensitive adhesive (118 on the top surface and 117 on the bottom surface). The respective release liners are not shown in the figures. The top PSA layer 118 seals the top laminate substrate 112 to the picture frame 113 and bottom PSA layer 117 can be used to seal the bottom laminate substrate 111 to the picture frame 113.

In an example embodiment, the picture frame assembly has a total thickness (excluding the thickness of the liners) of about 0.015" (about 0.005"-0.50"). The picture frame can be placed on lower laminate substrate 111 after removing a bottom release liner so that the electrodes are centered within the frame. In some cases, to ensure a leak-free construction, a sealing and/or caulking adhesive of double sided pressure sensitive adhesive PSA tape and/or heat sensitive sealing and/or caulking adhesive can be printed over the electrodes in the feed through areas of the electrodes (e.g., anode feedthrough 153 and cathode feedthrough 133).

The next operation in making cell 101 as shown in FIG. 2A is the addition of the cell electrolyte 299 to the starch ink layer 116 covering one or both electrodes. The electrolyte can be an aqueous solution of $ZnCl_2$ at weight percent of about 27% (about 23%-43%) that could also contain a thickener, such as carboxymethylcellulose (CMC) at about 0.6% level (about 0.1%-2%).

In cases where a starch ink or printable electrolyte is not used, a soak up separator 200, shown in FIG. 2, can be inserted over both electrodes prior to the addition of the electrolyte solution 299.

The cell is completed by applying and sealing the top laminate 112 over the picture frame. Prior to applying this top laminate, a release liner, if present (not shown), is removed from the top adhesive layer 118 on top of the picture frame 113.

Figure 5:
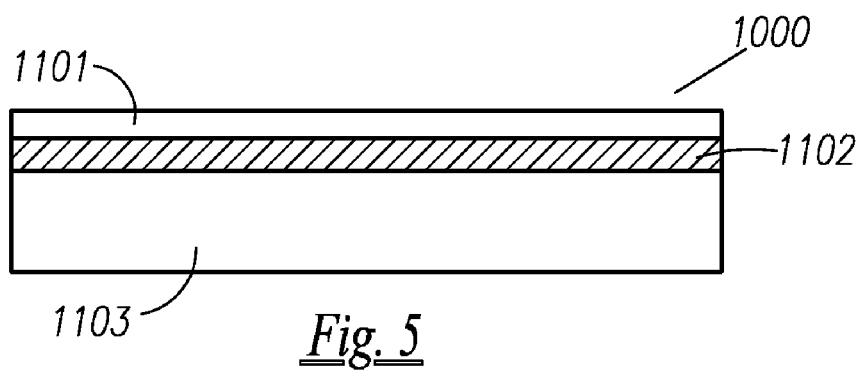
FIG. 5 shows a cross section view of one embodiment of a cell laminate.
Figure 5A:
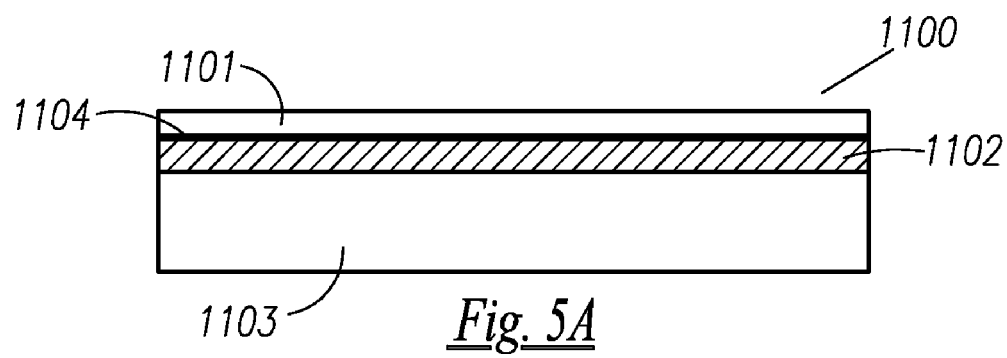
FIGS. 5A and 5B each show a cross section view of alternative cell laminate embodiments.
Figure 5B:
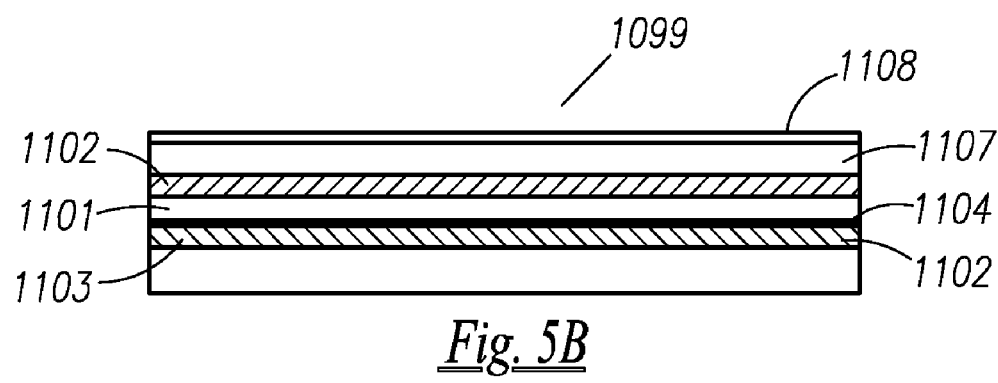

Three embodiments of example constructions of the laminated film substrates 111 and 112 are shown in FIGS. 5, 5A and 5B, respectively. The lower and upper laminated film layers can, in most cases and for most applications, be of the same materials. In at least one embodiment 1000, such as shown in FIG. 5, these film layers can be comprised of a three-ply laminate film, for example, such as that supplied by Curwood Inc., a Bemis Corporation Company of Oshkosh, Wis. A different structure of such a laminate is shown in the cross section drawing of FIG. 5A. This laminated film 1100 has four layers. The top layer 1101 placed on the inside of the cell has an example thickness of about 0.48 mil thick (about 0.2-5.0 mil) and is a high moisture barrier polymer layer such as the GL films supplied by Toppan of Japan. Typically, this polyester film has an oxide or metalized coating 1104 on the inside of the laminated structure. These polymer (polyester)-based barrier films, which can have varying moisture transmission values depending on the type and the amount of vacuum deposited oxides, or metals, and can be laminated to the bottom polyester layer 1103 and which acts as a structural layer with a Urethane adhesive 1102

Depending on the cell construction, the cell application, and/or the cell environment, it may be advantageous to have different barrier properties for the substrate. Due to the wide range of available vapor transmission rates available, the barrier layer can be chosen for each specific application and construction, as desired. In some cases, for example where the cell by design has a higher gassing rate, it may be appropriate and desirable to use a film with a higher transmission rate to allow for a larger amount of gas to escape, so as to minimize cell bulging. Another example would be an application that is in a hot dry environment such as a desert. In such cases, it may be desirable to have a barrier film with low transmission rates to prevent excessive moisture loss from the cell.

The outside layer, or structural layer, 1103 of the four layer structure of FIG. 5A is, for example, about 2.0 mil (about 0.5-10.0 mil) layer of orientated polyester (OPET), which is laminated to the other layers by means of an urethane adhesive 1102 that is about 0.1 mil thick, for example. This "structural layer" can be a Dupont polyester orientated (OPET) film such as their Melinex brand, for example. Another material that can be used is from Toyobo Co. Ltd. of Japan. This material is a polyester based synthetic paper, which is designated as a white micro-voided orientated polyester (WMVO-PET).

The use of a thicker substrate, by increasing any or all of the polymer thicknesses, may have some advantages: These may include one or both of the following:

The cells process better on printing press due to the thicker substrate being less temperature sensitive; and The cell package is stiffer and stronger.

In addition to the above specifications, both the outside and the inside layers could include the addition of a print-receptive surface for the required inks. The inside layer is used for the functional inks (such as the collector and/or electrochemical layers) while the outside layer can be used for graphical inks, if desired. Flat cell constructions having a sealed system might utilize a laminated structure that includes metallized films and/or a very thin metal foil or foils as a moisture barrier. Although such structures using a metal layer might have better moisture barrier properties than the constructions used for some of the above described embodiments, it might also have some disadvantages. These may include one or more of the following:

Laminated structures with metal barriers (thin metal foil or a vacuum metallized layer) are likely more expensive;

Laminated structures with metal layers have the possibility of causing internal shorts; and Laminated structures that include a metal barrier could interfere with the electronics of an application, such as the functionality of a RFID antenna, for example.

The film substrates 111 and 112 of FIGS. 1-4, and layers 800 and 900 of other figures, can be comprised of numerous variations of polymeric film, with or without a barrier layer (including metal or other materials), and can utilize either mono-layer or multi-layer films, such as polyesters or polyolefin. Polyester is a good material to utilize because it provides improved strength permitting use of a thinner gauge film and is typically not easily stretched when used on a multi-station printing press. Vinyl, cellophane, and even paper can also be used as the film layers or as one or more of the layers in the laminated constructions. If a very long shelf life is desired, and/or the environmental conditions are extreme, the four-ply laminate polymer of FIG. 5A could be modified to include a metallized layer such as obtained by vacuum deposition of aluminum in place of the oxide coating 1104.

Alternately, a very thin aluminum foil could be laminated within the structure of the film layer, such as for layer 1104, or in a different position. Such a modification could reduce already low water loss to practically nil. On the other hand, if the application is for a relatively short shelf life and/or a short operating life, a more expensive barrier layer could be replaced with a less efficient one which would be of a lower cost and still allow the cell to function for the required lifetime.

In applications where only an extremely short life is necessary, the cell package could instead use a film layer of a low cost polymer substrate such as polyester or polyolefin. It is possible that the pressure sensitive adhesive sealing system for adhering the frame 113 to the top substrate 112 and lower substrate 111 could be replaced with a heat sealing system on the laminates.

In a simplified construction of the upper and/or lower laminate substrate 1000 shown, as an example, in FIG. 5, laminate barrier layers 1101, 1103 could be laminated together with urethane adhesive layer 1102, for example. Alternatively, FIG. 5A shows a substrate 1100 provided with an additional layer 1104 that is a barrier coating on barrier layer 1101. In addition, the layers 1101 and 1103 could be laminated together with urethane adhesive layer 1102, thus forming a substrate 1050 as shown in the example of FIG. 5A.

Alternatively, FIG. 5B shows an example seven-layer laminate substrate 1099 that could be used for the substrate of the cell. Substrate 1099 has a heat sealing layer 1108 that is laminated to the previous structure using an adhesive layer 1102. The approximate 50 gauge heat seal layer 1107 can be a composite layer that also includes a heat sealing coating 1108 such as amorphous polyester (APET or PETG), semi crystalline polyester (CPET), polyvinyl chloride (PVC), or a polyolefin polymer etc. on polymer film such as polyester. One such example material is the Ovenable Lidding (OL) films made by Dupont and designated as their OL series such as OL, OL2 or OL13, for example. This would thus make the top substrate 112 and/or the bottom substrate 111 of the previously described cell into a 7-ply construction. Depending on the thicknesses of the various layers, any of these structures 1000, 1100, or 1099 (three-ply, four-ply, and seven-ply laminates, respectively), the total thickness of these laminates could be about 0.003" with a range of about 0.001-0.015" for at least some embodiments. Alternatively, different substrate constructions could be utilized as well, depending on the desired applications and qualities.

The materials for the cell construction of an example embodiment comprise the following materials: The cathode collector 131 includes a highly conductive carbon ink (e.g., PM024) such as manufactured by Acheson Colloids of Port Huron, Mich. The collector 131 can be printed on the lower laminate by commercial means such as screen printing, for example using a very coarse screen of about 61 mesh (about 20-180 mesh for some embodiments) to allow for a dry deposit of about 1 mil (about 1.2-0.4 mils respectively). A cell with a size of about 2"×2" would thus have a resistance of about 55 ohms (about 44-100 ohms). To further reduce this resistance, a highly conductive contact 132 could be printed at the external contact area of the positive electrode. The material used in this example construction is a silver filled conductive ink (SS479) manufactured by Acheson Colloids of Port Huron, Mich. which can be screen printed.

Other useable conductive materials, such as gold, tin, copper, nickel and/or mixtures of two or more conductive materials, along with other materials, could also be used for acceptable embodiments. Any of these conductive inks might be applied by means of, for example, a printing method, such as rotary screen, flexography, and gravure, as well as with ink jet printing techniques, for example. Additionally, manufactured foils of graphite and/or mixtures including one or more of conductive resins, metals, and graphite could be inserted and used, instead of printing an ink cathode collector. In applications where only very low currents are required, a highly conductive positive contact 140 may not be required, and/or if somewhat higher currents are desired, the circuit contact might instead be used as the high conductivity contact.

In an example embodiment, the cathode layer 130 can be printed on a portion of the previously printed and dried cathode collector layer 131 with an aqueous based ink that has a wet composition, for example, of about 43.4% of battery grade Manganese Dioxide (about 20%-60%), about 14.4% of KS-6 graphite (about 2%-25%), about 29.5% of about 6.5% (about 0.5%-15%) aqueous solution of polyvinylpyrrolidone (PVP) (about 20%-60%); and about 9.65% of De-ionized or distilled water (about 0.1%-20%). Such an ink can be printed with about a 46 mesh (about 10-65 mesh) fiberglass screen so as to allow a nominal dry lay down weight of about 0.10 grams per square inch (about 0.03-0.25 g/sq. in.). The amount of dry print would typically be dictated by the required cell capacity, using more material when a higher capacity is desired, for example. By using this unconventional printing method utilizing a very coarse mesh screen instead of multiple hits of a finer mesh screen, the number of printing stations can be reduced and the cell performance can be increased.

The electro-active cathode layer (130) material used in this example construction includes, for example, an electrolytic manganese dioxide of high purity battery grade. The material particle size range for this embodiment is, for example, about 1 to 100 microns with an average size of about 40 microns. If additional fineness of the material is required to facilitate the application to the collector, the material can be milled to achieve a particle size range of about 1 to 20 microns, with an average of about 4 microns, if desired. Other usable electro-active cathode materials that may be used in conjunction with the zinc anode in the subject construction, are silver oxides $Ag_2O$ and/or AgO, mercuric oxide HgO, nickel oxide NiOOH, oxygen $O_2$ (as in the form of an air cell, for example), and Vanadium oxide $VO_2$, for example. Cathodic materials that may be used with different anodic materials include one or more of NiOOH with Cd, NiOOH with metal hydrides of the $AB_2$ and the $AB_3$ types, and NiOOH with Fe and $FES_2$, for example.

A binder used in the cathode layer of an example embodiment includes a class of high molecular weight binders that exceed about 950,000-grams/mole. One such polymer that can be used is polyvinylpyrrolidone, about K 85-95 or about K 120 (higher molecular weight). Other classes of materials that can be used include one or more of the following: polyvinyl alcohol; classes of starches and modified starches, including rice, potato, corn, and bean varieties; ethyl and hydroxy-ethyl celluloses; methyl celluloses; polyethylene oxides; polyacryamides; as well as mixtures of these materials. Additional binding may be derived, if desired, from the use of Teflon solutions or Teflon fibrillated during the blending process.

For an example embodiment, a precut anode strip foil, which can be a laminate 160 (and of possible dimensions of about: 1.75"×0.20"×0.002", for example), is inserted onto the lower substrate adjacent to the cathode collector/cathode assembly at a gap of about 0.050" (about 0.010"-0.100") from this assembly. Prior to insertion, the 2 mil battery grade zinc foil can be laminated to a dry film adhesive with a release liner, such as #2180, IB1190 or IB2130 manufactured by Morgan Adhesive Co. of Stow, Ohio. After this lamination is completed, for example on a wide roll of zinc (e.g., about 3-12' wide), this laminated structure can be slit into narrow rolls with a width of about 0.200" (about 0.170"-0.230") for an about 1 sq. inch cathode cell. Cells with other sizes of cathodes can utilize different slit widths for the anode laminate. In another construction, the lamination could be done with a printed adhesive on the substrate prior to applying the zinc foil strip, for example.

It has been found that the cell construction described above, as compared to the previously described construction in an earlier application assembled on a horizontal pouch filler construction (see application Ser. No. 11/110,202, which is incorporated by reference), the cell embodiments disclosed herein (among others not specifically disclosed, but otherwise supported by this disclosure), by utilizing the picture frame construction, can reduce air entrapment, thus these cells can have a flatter profile, can be thinner, as well as being more easily made into non-rectangular shapes. Also, these cells may be able to withstand larger compression forces, which may be important if the cells are to be laminated into an application such as a credit card, for example.

Furthermore, the cells can be constructed in a different manner than that disclosed in the "pouch" design described in the above cited application, and can thus possibly avoid the need for the paper layer disclosed in that application, at the cost of possibly adding a manufacturing step of adding the picture frame structure, which can be done utilizing a printing process, for example. Thus, an additional printing station might be utilized in the process of the invention.

Furthermore, a printed electrolyte (e.g., using an ink or flowable gel) could be substituted for the liquid electrolyte and paper separator of the above referenced application. The embodiments disclosed herein could also avoid the folding step utilized in that application. The cells disclosed herein may be made entirely on a printing press, for example, and thus may be integratable directly into the application circuitry. Furthermore, because the construction disclosed herein allows the cell to be made relatively flat, the cells of the invention might be utilized for laminating into smart cards, for example. Accordingly, possible higher capital costs might be offset by increased utility.

To make these thin, printed flexible flat cells at high speeds and at low cost, the invention provides a format and process for applying the components to the cell package container (laminated films and a picture frame), as well as to process the film with the applied cell components and automatically assemble them into cells. To facilitate this production process, some parts and/or materials of the example cell constructions described above can be modified as shown in FIGS. 6-21 and as described in the following paragraphs:

This updated construction, according to one embodiment, begins with laminate web 900, which provides the lower laminate substrate 111 in this construction, and proceeds through numerous stations that are compatible with a high speed printing press running a roll-to-roll setup. The initial summary described below includes the basic steps for producing the completed cell in one pass on a printing press, for example.

According to available printing presses, the cells could be made with one pass, or multiple passes, on a given press, for example. The drawings illustrate, as an example, two rows of cells on the web; however, the number of rows is limited only to the size of the unit cells and the maximum web width that the press can process. Because there may be numerous steps, thereby likely requiring a long and complicated press, some of these steps, as well as some of the materials, could be modified and/or multiple passes of a press or multiple presses could be used. Some modified process summaries will be shown after the initial discussion is completed.

Figure 6:
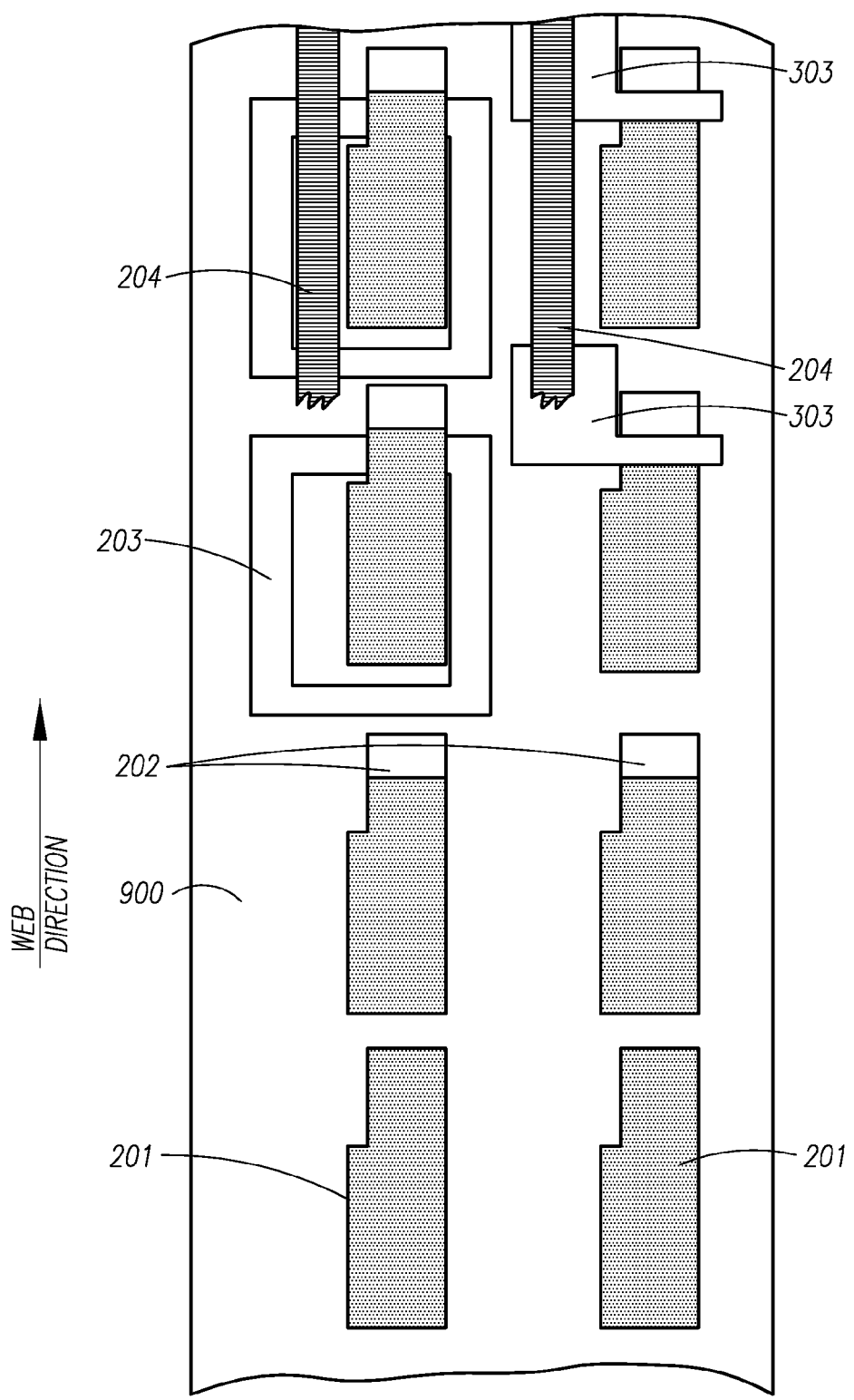
FIG. 6 shows a plan view of a printed web for a cell embodiment, shown subsequent to processing using a high speed printing press, after stations #1-#4.
Figure 17:
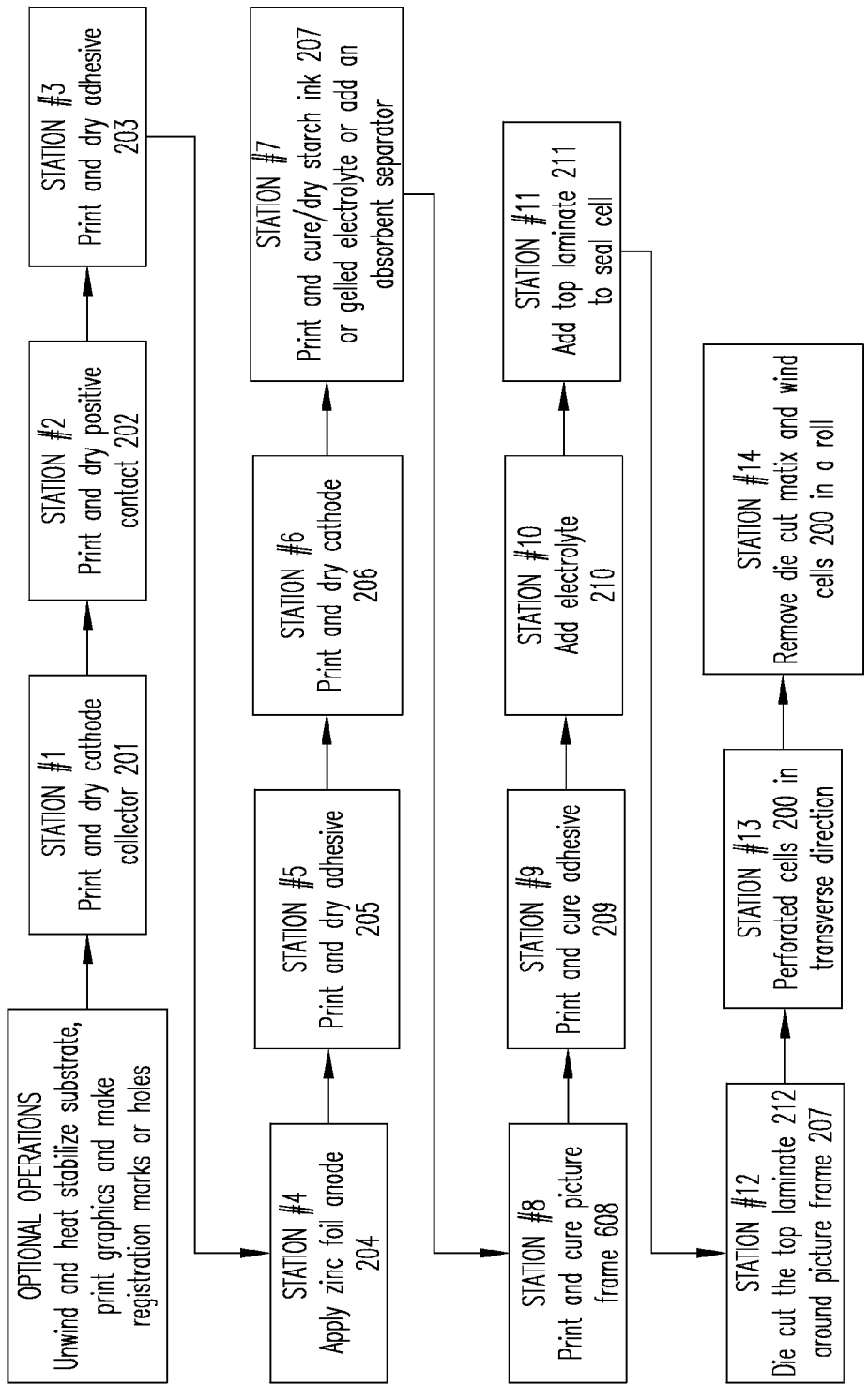
FIG. 17 is a flow chart showing another manufacturing process that can be used to produce cells according to at least some embodiments
Figure 18:
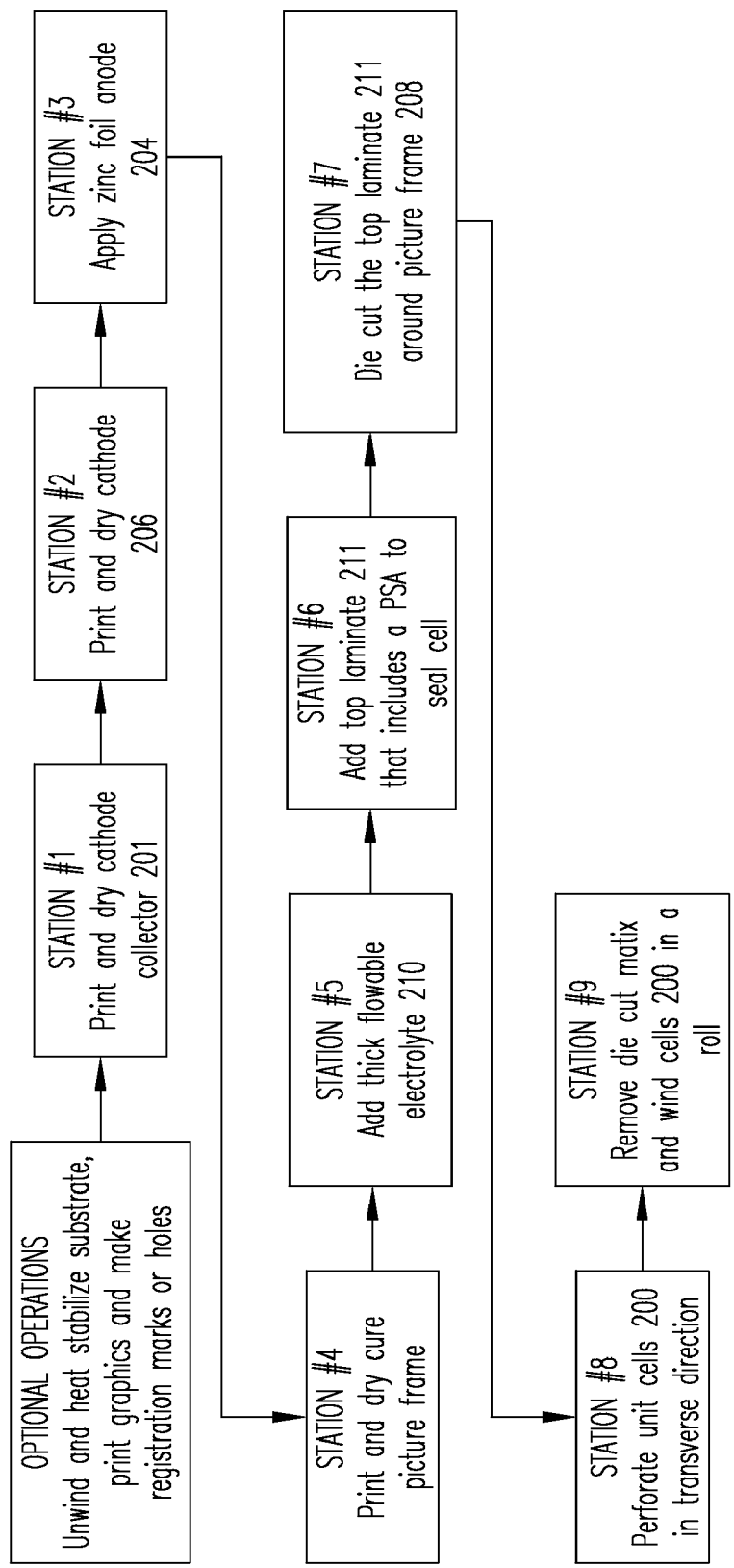
FIG. 18 is a flow chart showing a manufacturing process that can be used to produce cells according to at least some embodiments.

As shown in the flow diagram of FIG. 17, before the cell/battery is processed on the web 900 of FIG. 6, some optional operations may or may not occur. These optional processes could include one or both of heat stabilization of the web and graphics printing (which could include logos, contact polarities, printing codes and the addition of registration marks on the outside surface of web 900). If these optional printing operations (not shown) occur on web 900, then the web 900 can be turned over and the functional inks are printed on the inside surface, which thus becomes bottom laminate 111.

Figure 7:
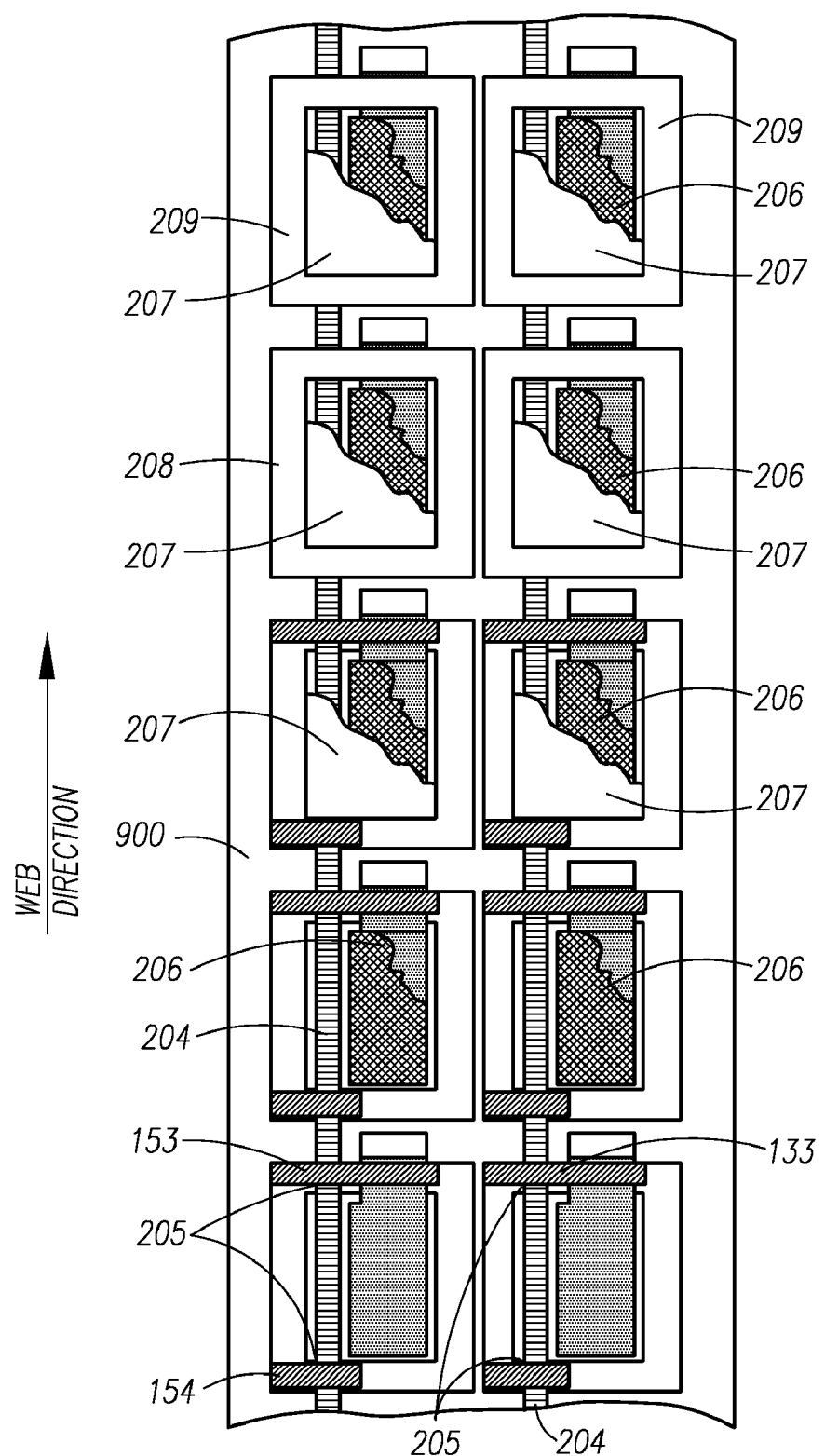
FIG. 7 shows a plan view of the printed web of a high speed printing press subsequent to processing at stations #5-#9.
Figure 7A:
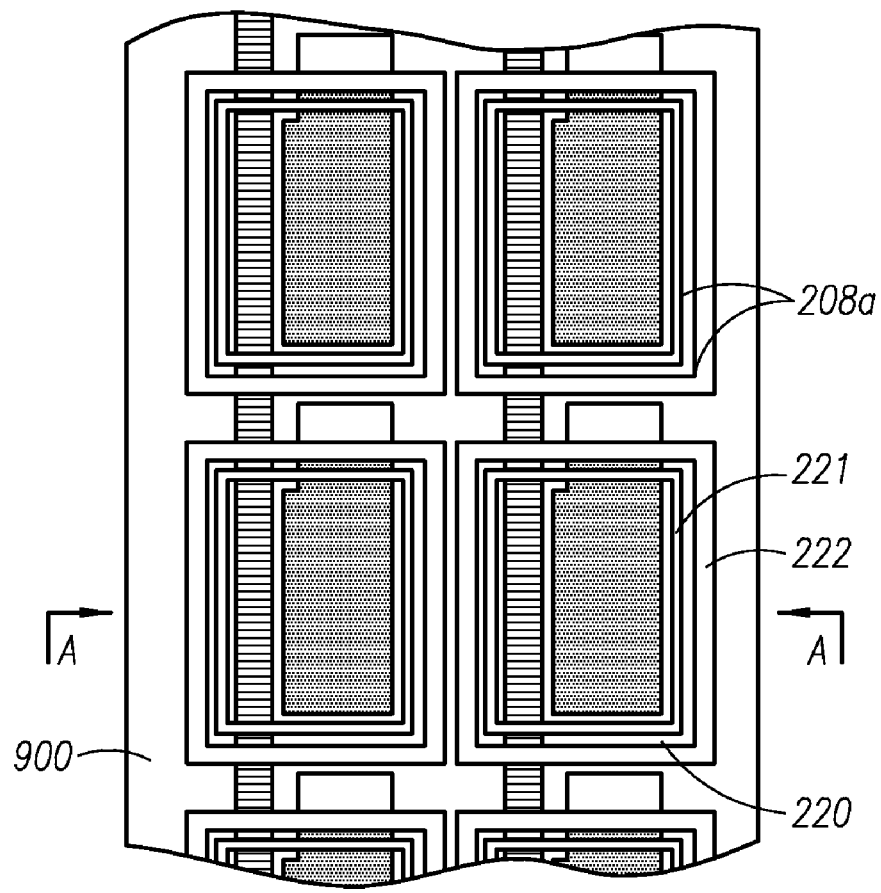
FIG. 7A shows a plan view of the printed web of a high speed printing press subsequent to processing at station #7 and station #8, shown in a special picture frame design.
Figure 7B:
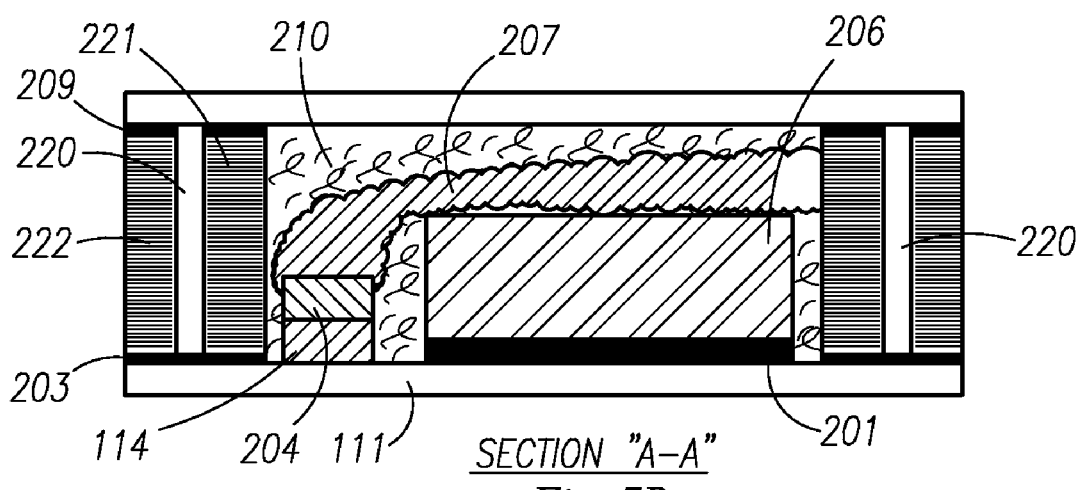
FIG. 7B shows a cross section view of a unit cell taken through electrode areas using the special frame shown in FIG. 7.
Figure 8:
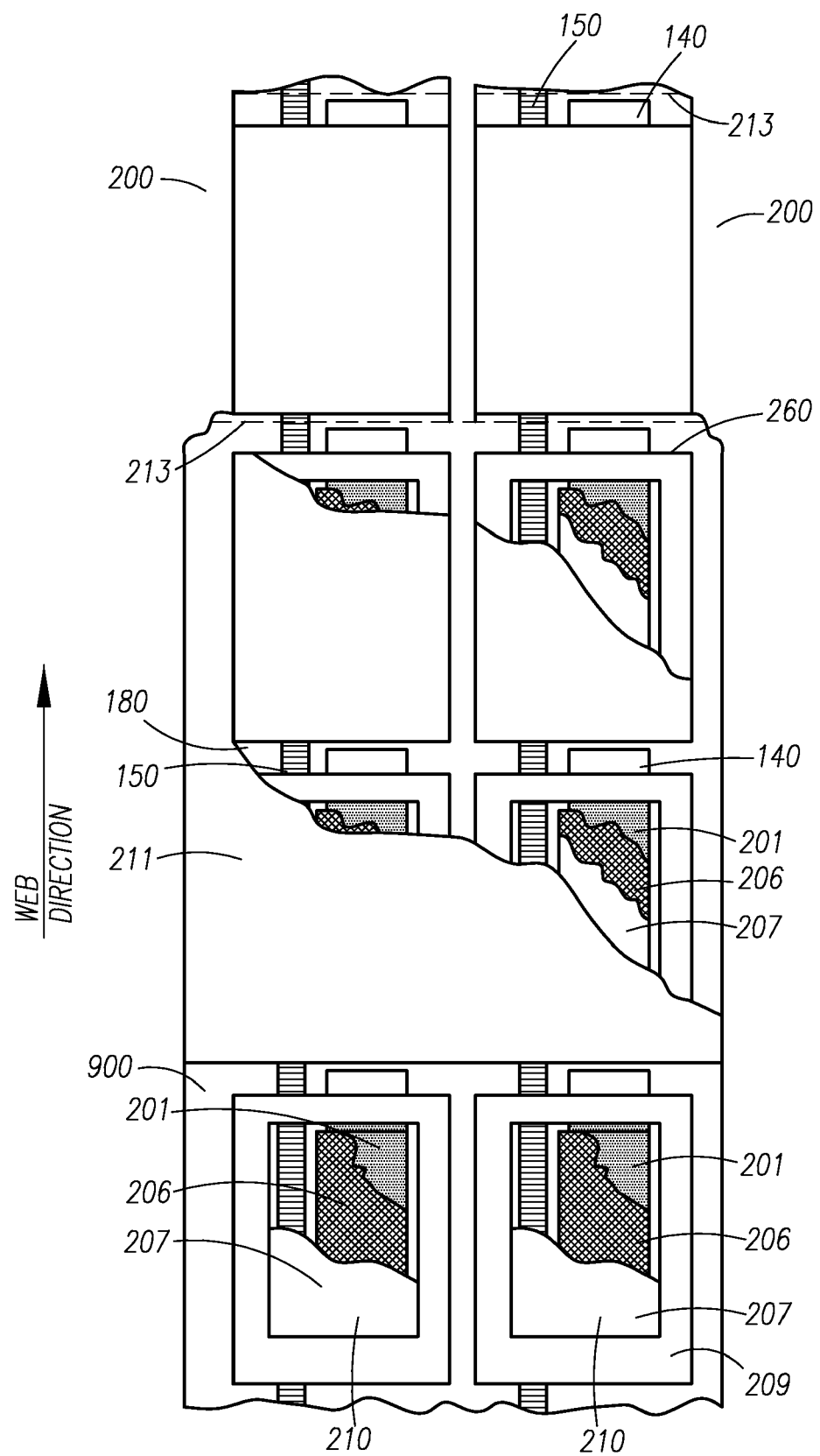
FIG. 8 shows a plan view of the printed web of a high speed printing press subsequent to processing at stations #10-#13.

The cells, such as shown in FIGS. 6, 7, and 8, can be constructed according to the following example process:

1) In a first print station, the cathode collector 201 is screen printed with a highly conductive carbon ink;
2) In a second station, a silver contact 202 is screen or flexo-graphic printed over a portion of the top of collector 201. This may be only required for high drain applications;
3) A third station prints the adhesive frame 203 (heat sensitive or pressure sensitive, for example) that forms the cell perimeter; Alternatively this adhesive pattern could be printed only in the area 303 of the zinc foil as shown in FIG. 6.
4) A fourth station laminates a continuous strip of zinc foil 204. This could be an assembly comprised of the zinc foil 115 and PSA film 114 with a release liner which is removed just prior to laminating to web 900; Alternatively, just a zinc foil strip that is fastened to web 900 by means of adhesive 203 or 303 could be used instead, for example.
5) A fifth station prints a caulking/adhesive layer 205 over the feed-through of the cathode collector 201 and negative electrode 204. These feed-throughs, 133 for the positive electrode and 153, 154 for the negative electrode, are shown in FIG. 7;
6) A sixth station screen prints the cathode 206 over part of the cathode collector 201;
7) At a seventh station, the "starch ink" or the electrolyte 207 is printed over the anode and/or cathode that are to be inside the picture frame. Alternatively a "paper separator" or another type of soak-up material could be added at this station.
8) An eighth station prints the picture frame 208 around the active ingredients of the cell. This station can use, for example, a dielectric material that could, for example, be UV cured or some other curing and/or drying methods. This material, such as Acheson Colloid's PM030, is also a pressure sensitive adhesive, thus eliminating the need to print the adhesive 209 in the ninth station
   NOTE: An alternate construction for the picture frame is shown in FIGS. 7A & 7B. FIG. 7A is a plan view of part of the web 900, while FIG. 7B is an enlarged section view of one unit cell. This construction features anti-leakage reservoir 220 around the entire perimeter of the active area of the cell. If the picture frame uses a pre-cut polymer, then the leakage reservoir 220 could be discontinuous at each corner, and/or at other locations, so that the inner frame 221 is connected to the outer frame 222. If the inner frame 221 develops a leak, then this electrolyte would be stored within the reservoir 220, hence the cell leakage would be contained, and thus not spread to the exterior of the cell or its application.

9) A ninth station prints a PSA layer 209 on top of the dielectric picture frame 208 or 208A using the same geometry as picture frame 208 or 208A;

10) At a tenth station, shown in FIG. 8, the cell electrolyte 210, in the form of a viscous liquid (such as a gel) is added on the inside area of each unit cell if a starch ink or a sheet material is added in station #7.

11) At the eleventh station, the top laminate 211 is added to the top of the picture frame and due to the layer of adhesive 209 (pressure or heat sensitive), the cell is completely sealed around its perimeter after pressure and/or heat is applied 12) At a twelfth station, the top laminate substrate 211 as well as web 900 can be die cut on the outside of each cells 200 picture frame 208 or 208A, on three sides. On the fourth side 260, only the top laminate 211 is cut thus providing a series of unit cells 200 with the electrical contacts (negative 150 and positive 140) exposed on the bottom laminate substrate web 900 extensions of each cells;

13) At a thirteenth station, the unit cells 200 can be perforated in the transverse direction along a line 213 between the trailing edge of the picture frame 208 and the top edge of the cell contacts 150 and 140; and 14) At a fourteenth station, the die cut matrix is removed and each row of cells 200 are wound up on a roll.

One skilled in the art would realize that there are many methods, materials, and sequences of operations that could be used to accomplish this invention, and that different numbers of stations could be utilized. An example of such a different process is shown in the flow diagram of FIG. 18, where materials and steps have been modified so that operations might be completed in fewer stations, thus possibly making a more cost effective and efficient process.

1) First operation:—print cathode collector on the web 900 (Many applications require only low currents, thus the higher conductivity of the silver contact may not be required or, if higher currents are required, the high conductivity for the contact could, instead, be made part of the circuit design;

2) Second operation—Print the cathode layer on part of the cathode collector (if present);

3) Third operation:—laminate zinc foil/PSA laminate to the web 900;

4) Fourth operation:—print dielectric the picture frame around the cells active materials;

5) Fifth operation:—add viscous electrolyte to the active materials inside of picture frame;

6) Sixth operation:—seal the cell, for example by laminating to its top the top laminate substrate which as on its inside surface a pressure sensitive adhesive (PSA);

7) Seventh operation:—die cut the top laminate around the picture frame and, with the same rotary cutting die, perforate the cells between the picture frame and cell extension (contact areas);

8) Eighth operation:—perforate the cells between the picture frame and cell extension (contact areas);

9) Ninth operation:—Slit each row of cells and wind onto a roll.

The manufacturing process might be further modified by eliminating the zinc foil/adhesive laminate by printing the anode layer instead. This could be done by one of the following techniques:

One method would be to make a conductive zinc ink similar to the discussed conductive silver, conductive nickel, or carbon inks, etc. A typical example is shown by cell construction 600 shown in FIGS. 9-12. In these figures, all of corresponding parts have the same numbers as those in the construction of FIGS. 1-4 (shown in cell construction 101), except that those parts that have been changed have new numbers.

Some of these changes include the printed anode 660, which can be made, for example, about 0.20" wide and about 0.002" (about 0.0003-0.005") thick. The width and thickness of this structure impacts the cell capacity, and thus the above dimensions are only typical for a cell size as described in this disclosure.

Figure 9:
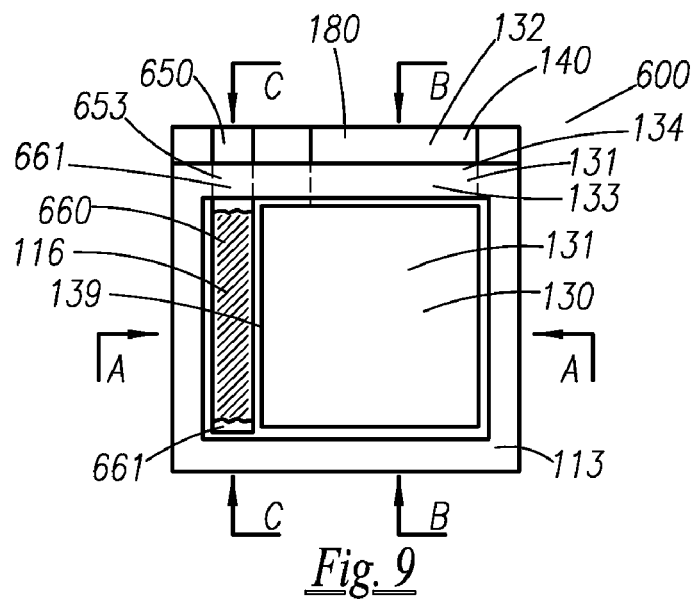
FIG. 9 shows a plan view of a unit cell 600.
Figure 10:
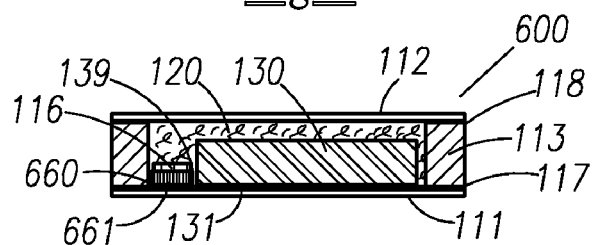
FIG. 10 shows a cross section view of the unit cell 600 taken through electrode areas.
Figure 11:
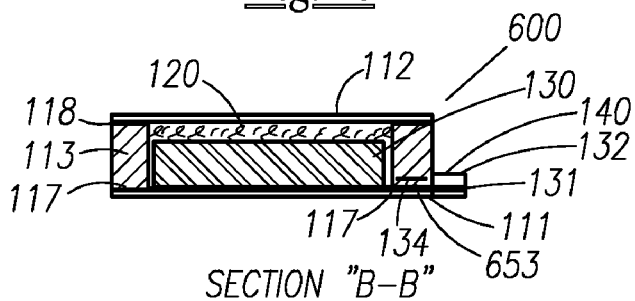
FIG. 11 shows a cross section view of the unit cell 600 taken through the entire length of the first electrode.
Figure 12:
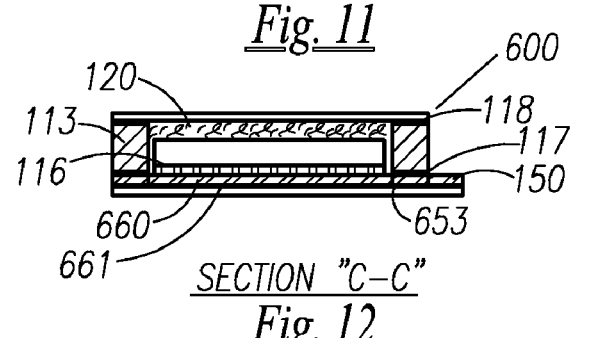
FIG. 12 shows a cross section view of the unit cell 600 taken through the entire length of the second electrode.

Furthermore, caulking/adhesive layer 653 can be printed on top of the anode 660 and cathode collector layer 131 in an area that falls under the picture frame 113. As in FIG. 1, for clarity purposes, cell 600 in FIG. 9 is shown without the top laminate substrate.

Figure 13:
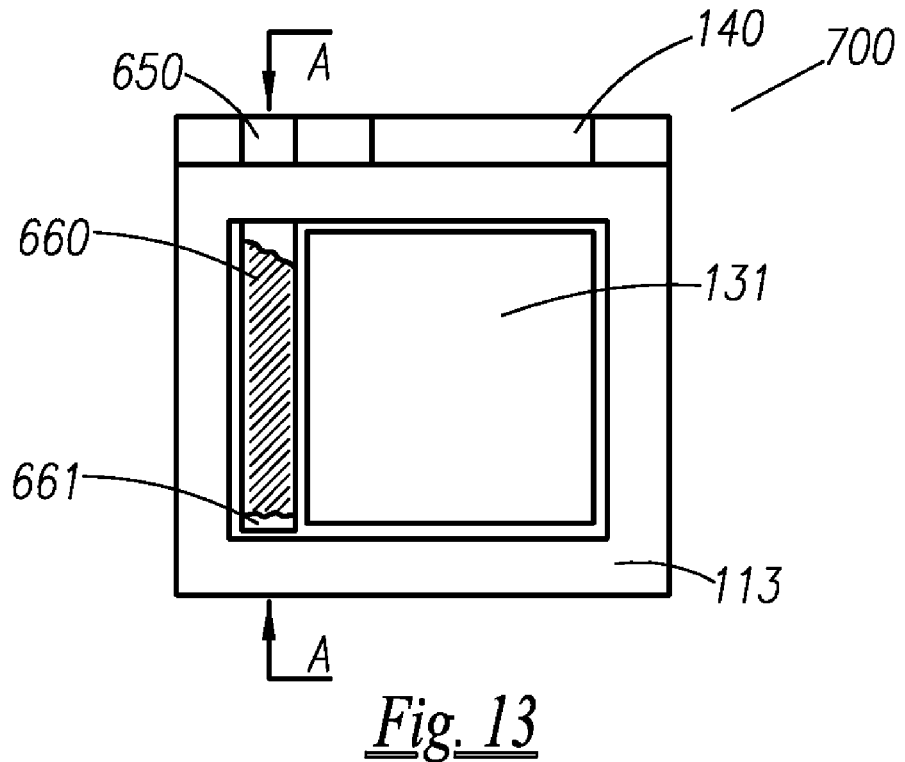
FIG. 13 shows a plan view of a unit cell 700.
Figure 14:
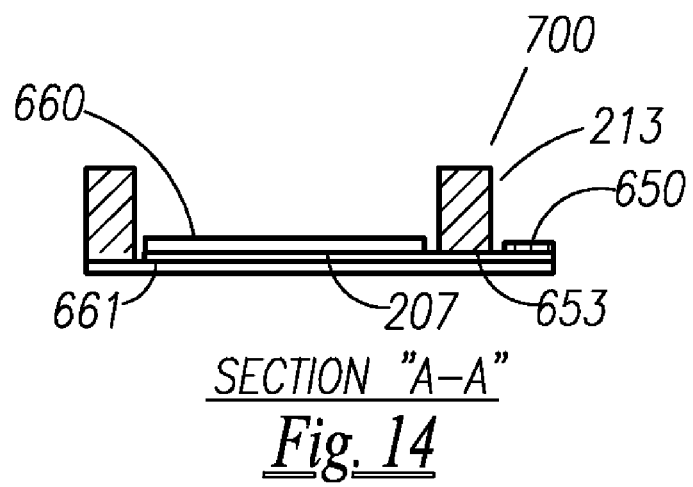
FIG. 14 shows a cross section view of the unit cell 700 taken through the entire length of the negative electrode.

Because conductive inks can be difficult to make, an alternate example embodiment of a printed anode cell is shown in FIGS. 13 and 14. These figures do not show all of the cell components, but point out those items related to a printed anode. The alternative method of production could be to print a conductive pattern (e.g., an anode collector 661) that is in about the same location as the desired anode and the anode contact. The material for the conductive pattern could utilize the same material as the conductive carbon used for the cathode collector 131. By using the same material, an extra printing station would not be required, since this material is already being printed for the cathode collector 131. The major restriction for choosing the anode collector material is its compatibility with the zinc anode, thus a useful material is carbon. Other materials that may be used include platinum, titanium and/or tantalum. The need for the anode collector is based on the fact that zinc ink can be difficult to make conductive, thus when a non (or low) conductive zinc ink is used, the anode should have a current collector for the same reasons that the cathode requires a cathode collector.

To make the anode even more conductive, a highly conductive anode contact 650 can be printed on top of the anode collector 661. This could be a silver ink, or other highly conductive material, for example, which could be printed at the same time and at the same station as the cathode contact 140. The anode 660 could be printed directly over the anode collector 661 in the area inside of the picture frame 113, for example. The use of the printed anode concept may have many advantages when compared the zinc foil/adhesive laminate. Some of these may be as follows:

First, the anode application can be done on-line and at the same time the remaining parts of the cell are printed, thus the off-line operations of zinc foil to adhesive lamination and the slitting of this zinc/adhesive laminate could be eliminated. Also, the application (lamination) of the zinc foil/laminate on a special printing press station, or in an off line operation, could be eliminated.

Second, the thickness of the printed material in the seal area, whether the collector or the anode, could be made much thinner than the zinc/adhesive laminate, thus allowing for a better sealing condition that is the same or similar to the cathode collector.

Third, the zinc foil/adhesive laminate can be most easily applied in a continuous strip in the machine direction, and its geometry can be limited to rectangles, and with a width that is limited to the slitting capabilities. Also, because the strip is continuous, the laminate could be applied to the entire cell length, even in the bottom seal area. This feature, however, could might cause an increase in laminate usage as well as complicate the bottom seal area in terms of process and effectiveness. The printed anode could be of any geometry and printed easily in the machine direction as well as in the transverse direction.

Fourth, the printing of the anode and/or anode/anode collector could allow for an easy direct connection of unit cells into battery packs directly on the printing press using ordinary conductive inks such as Acheson's SS479, and even without the use of conductive adhesives and/or solders etc. If zinc foil was used in the unit cell constructions, the same process could be done; however, special conductive inks with a high degree of flexibility such as Acheson's PM046 silver ink would probably be necessary.

Figure 15:
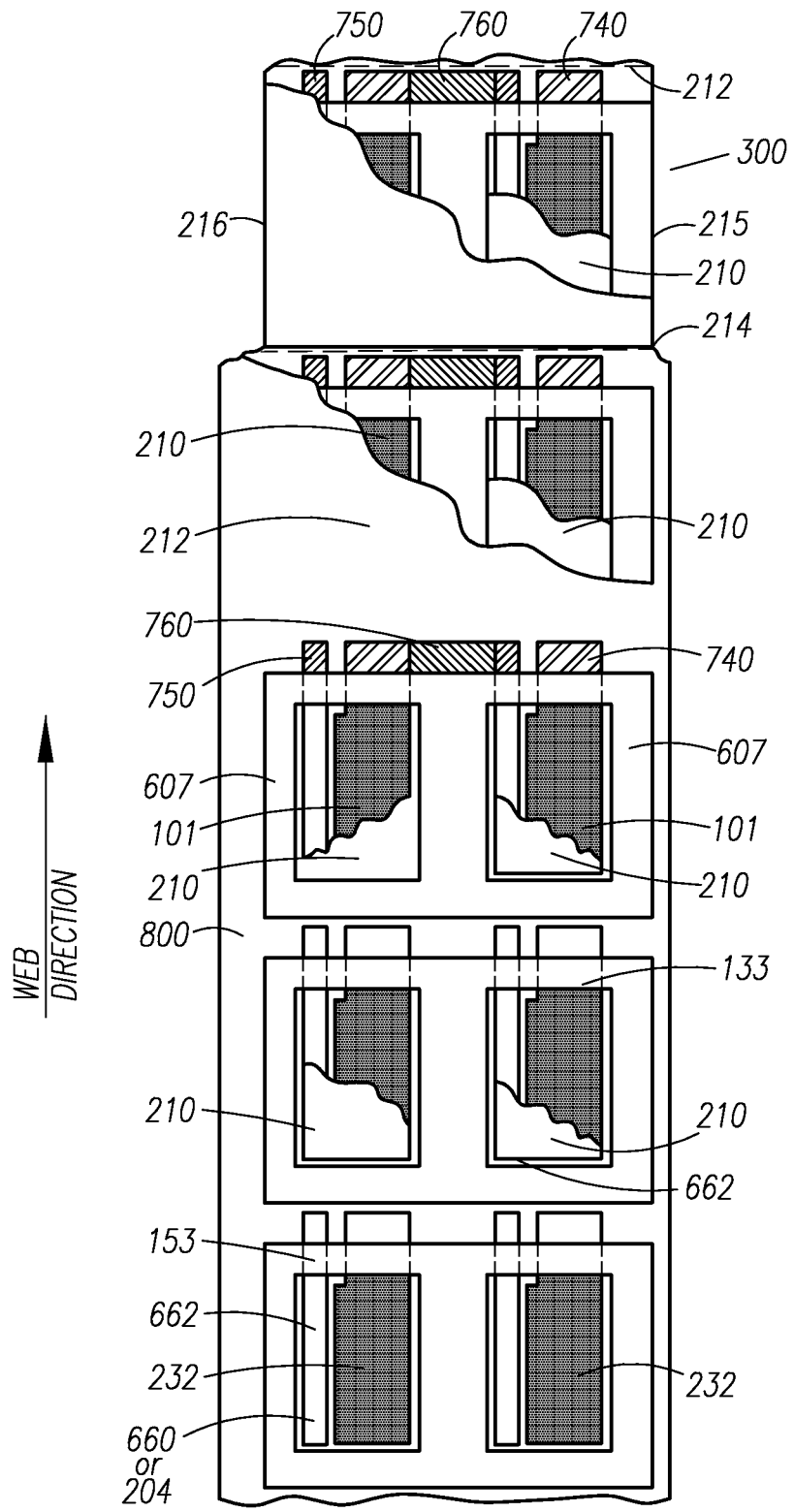
FIG. 15 shows a plan view of the printed web of a high speed printing press through five stations to make a 3 volt battery of one embodiment.
Figure 19:
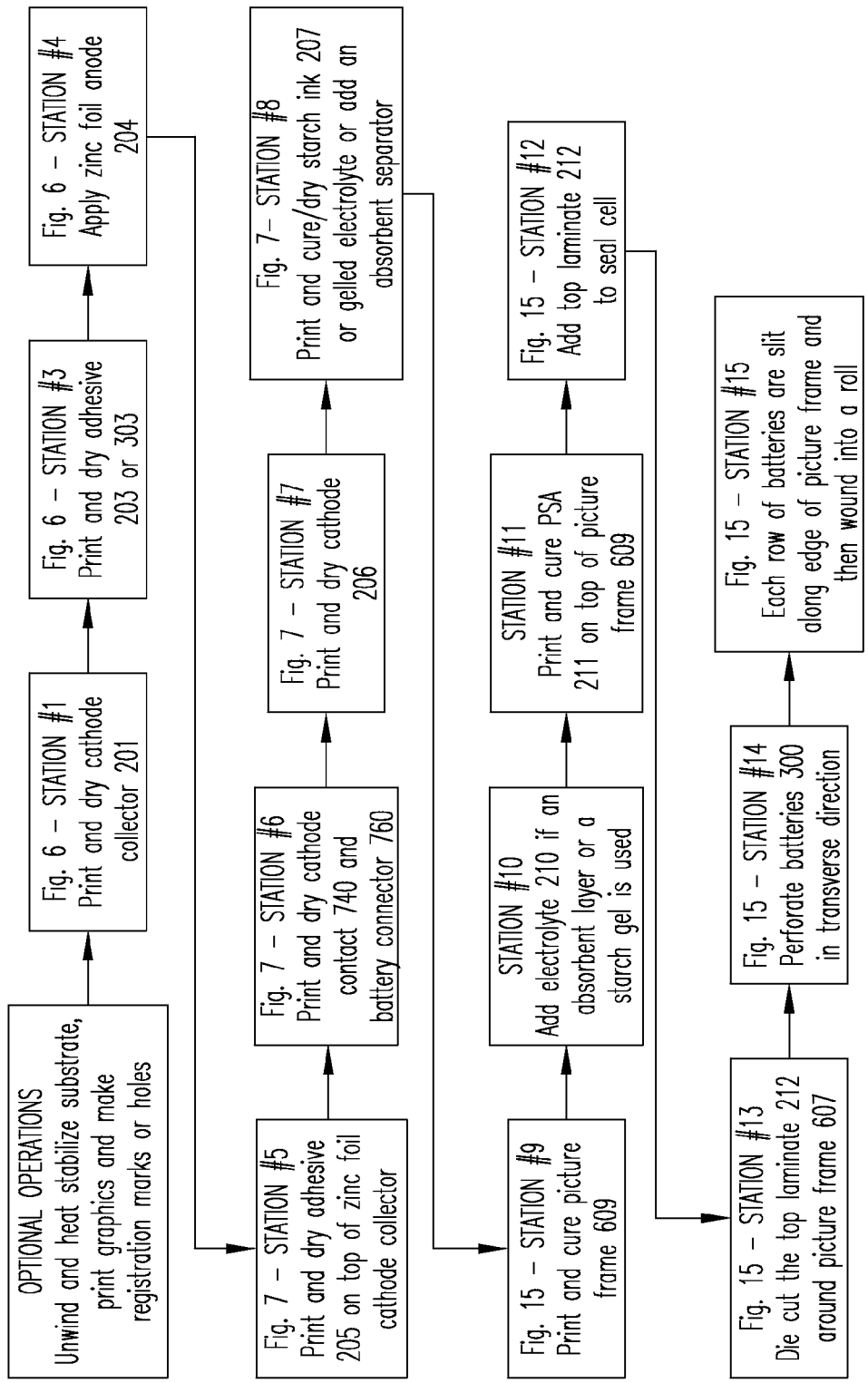
FIG. 19 is a flow chart showing another manufacturing process that can be used to produce batteries comprising one or more cells according to at least some embodiments
Figure 20:
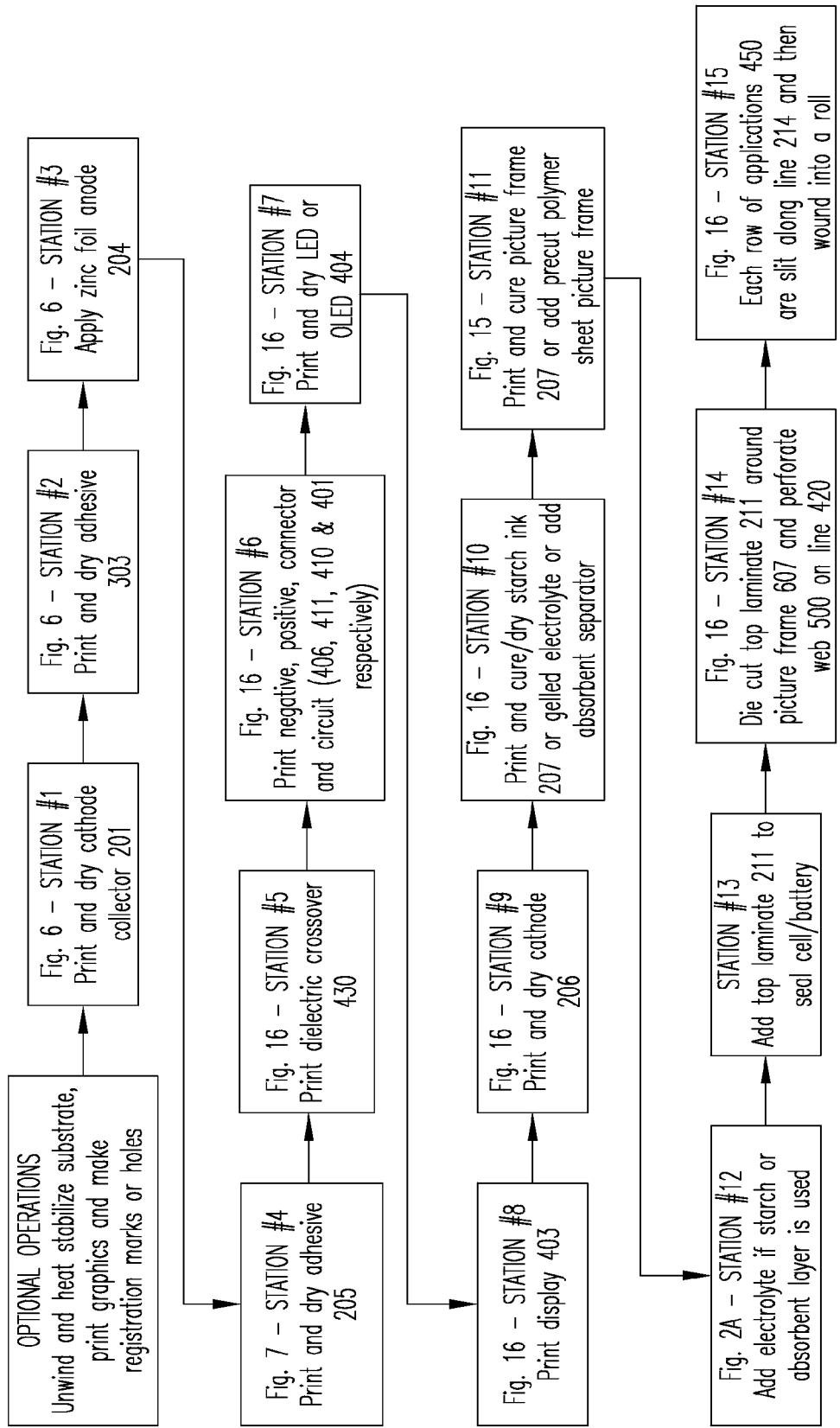
FIG. 20 is a flow chart showing another manufacturing process that can be used to produce cells integrated with an electronic application according to at least some embodiments

An example of the printing of the cell/battery construction and connections is detailed in FIG. 15 and the process shown in the flow diagram of FIG. 19. Web 800 is shown as a single row of batteries for illustrative purposes. Depending on the battery size and the maximum roll width that the method can process, the number of rows of batteries can be varied.

Web 800 is printed in a similar manner as web 900 as described for FIGS. 6-12; however, some of the materials and shapes have been modified. The parts of web 800 include printed the anode assembly 662 and this could include anode collector 661 and anode 662 or just printed anode 660. As stated above this type of construction can also be made using the previously discussed zinc foil/adhesive laminate 204 from the previous discussions. Also included is printed cathode assembly 232, which typically includes both a cathode collector 201 and a cathode 206 (although for some embodiments, the collector may be unnecessary). Further included are printed adhesive/caulking for the positive feedthrough seal 133 and the printed adhesive/caulking for the negative feedthrough seal 153.

The picture frame 607, which is typically provided as one frame surrounding both cells in the shown 3 volt battery package, is also included. This frame could be printed, or it could be formed from a pre-punched polymer sheet such as polyvinyl chloride, polyester etc. Both of these embodiments have been explained earlier in the description. Before or after the picture frame (607), which is the electrolyte leakage reservoir, is printed or laminated in place surrounding the two unit cells 101, the battery positive contact 740 is printed, for example at the same station as battery negative contact 750 (In the case where zinc foil is used as part of the anode, the negative contact may not need to be printed); however the battery series connector 760 can still be printed.

A contact material including a silver ink such as Acheson Colloids SS479 or PM046 can be used, for example. Other contact materials such as described earlier could also be used. To complete the two unit cells 101, the cells are "activated" by adding the viscous electrolyte 210 to each unit cell 101 inside of the picture frame 607, or a gelled type electrolyte can be printed over both electrodes (cathode 232 and anode 660 or anode assembly 662 or zinc foil 204 from FIG. 6). If a printable electrolyte is used, such as a hydro gel base or some formula requiring an UV or chemical cross linking, or some other alternative, it could be printed prior to the printing of the picture frame, for example.

After the unit cells 101 are activated, the cells are sealed by laminating, to the top of the picture frame 607, the top laminate 212 which can have, on its inside surface, a pressure sensitive adhesive 500. This top laminate 212 can then be die cut around the outside edge of the picture frame; with the same rotary cutting die, web 800 can be perforated between the picture frame and the battery extension, which contains the positive contact 740, the negative contact 750, and the battery series connector 760.

The batteries 300 can then be completed by slitting each row of batteries along edges 215 and 216, and then wound onto a roll for assembly at a later date. This same process could be used to make other battery constructions such as batteries with series connections for higher voltages and/or with parallel connections for increase capacities and/or for increased current drains. Also, with proper conductive adhesives, this construction concept could also use zinc foil 204 in place of the printed anode 660 in combination with a flexible conductive ink, such as Acheson's silver ink PM 046, put between the connector 760 and the anode contact. This flexible ink could also be used in the previously described constructions, if desired.

The above descriptions explain examples of sequences of operations that would allow the entire cell and/or battery to be printed, activated and sealed in one or more passes on a printing press. To further make the manufacturing process of a cell/battery more efficient, it could be integrated with the manufacture of an electronic component (for example, one to be powered by the battery or cell), thus the completed electronic application with the power source can be manufactured at the same time. This integrated procedure is illustrated in the flow diagram of FIG. 20 and described in the following paragraphs.

Figure 16:
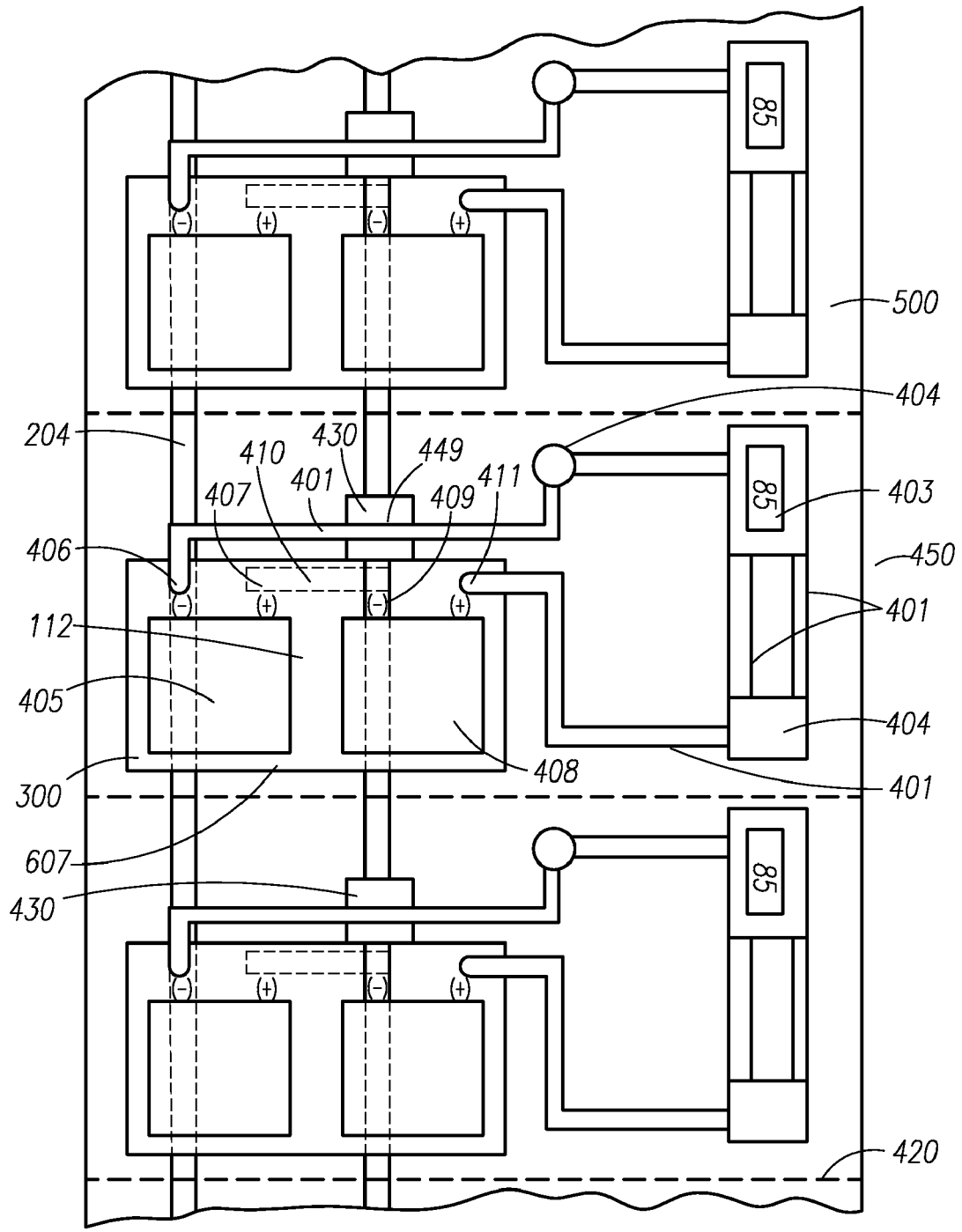
FIG. 16 shows a plan view of the printed web of a high speed printing press showing the assembly of an integrated circuit and battery assembly.

The integrated process begins with web 500 shown in FIG. 16, which acts as the bottom laminate substrate for the battery 300 as well as the substrate for the electronic components such as a thermal sensor with a display. The process to make this integrated part begins with the initial steps to make batteries 300 of FIG. 15 on web 800. For the purpose of this discussion, web 500 of FIG. 16 is shown being wider than web 800 shown in FIG. 15, thus allowing for room to also print the required circuitry of the integrated application 450 shown in FIG. 16.

Web 500 is printed in a similar manner as web 800, as described for FIG. 15; however, some of the materials and shapes have been modified. The parts of web 500 include the same battery parts as does web 800 in FIG. 15, seal 153.

The battery picture frame 607, which is typically provided as one frame surrounding both cells as is shown in the 3 volt battery package, is also included. This frame 607 could be printed, or it could be a pre-punched polymer sheet. When the a integrated process is used, the dielectric picture frame 607 is modified to include a dielectric pad 430 to allow the circuit 401 to cross over the continuous strips of zinc 204 at junction 499 to reach battery negative contact 406 Both the printed and polymer embodiments have been explained earlier in the description. After the picture frame 607, or 607A which has the electrolyte leakage reservoir, is printed or laminated in place surrounding the two unit cells 101, the battery positive contact 740 can be printed at the same station as the battery series connector 760. (411 and 410, respectively, in FIG. 16.)

Referring now to FIG. 16, the contact material can be a silver ink such as Acheson Colloids' PM046. This material was chosen due to its flexibility and its ability to main good electrical contact even though the print pattern has a step such as when the battery series connector 410 is printed on top of the taller zinc adhesive laminate 204. Other contact materials such as described earlier could also be used depending on the application. Also, while printing the cell/battery contacts and connectors 407, and 410 (740 and 760, respectively, in FIG. 15), the circuit 401 can also be printed. The circuit 401 begins at the battery 300 negative terminal 406 and positive terminal 411 and continues until the entire circuit 401 is completed. In this example, the circuit includes a printed or inserted LED 404 to indicate that the circuit is operating, a display 403, which could be a single icon to indicate that the temperature is in or out of the acceptable range, for example. FIG. 16 shows a temperature display, thus the actual temperature can be observed at all times. The circuit also includes an IC chip 404 that is inserted after the circuit printing is completed.

Referring back to FIG. 15, to complete the two unit cells 101, the cells are "activated" by adding the separator/electrolyte layer to each unit cell 101 inside of the picture frame 607 or 607A, This could include a viscous electrolyte 210 without a separator type material and/or a layer that flows over both electrodes (cathode 130 and printed anode 660 or zinc foil anode 204). A gelled type electrolyte can be printed over both electrodes (cathode 130 and anode 660 or 204) or an independent separator layer provided covering both electrodes (cathode 130 and anode 660 or 204), such as a coated Kraft paper or a material like a "paper towel", for example, after which the aqueous electrolyte is added to the cell cavities inside of the picture frame 607.

After the unit cells 101 are activated, the cells are sealed by laminating, to the top of the picture frame 607 or 607A, the top laminate substrate 212 which can have, on its inside surface, a pressure sensitive adhesive 500. This top laminate 212 can then be die cut around the outside edge of the picture frame, and thus the battery extension, which has the battery terminals 406 (negative) and 411 (positive) as well as the components of circuit 401 that are left exposed and accessible. After the integrated battery/circuit application 450 is completed, each application 450 can be perforated on line 420, and then each application can be completed by slitting each row of applications 450, and then winding onto a roll for use at a later date. This same process could be used to make other integrated battery/applications, such as batteries with different voltages and/or with parallel connections and having different capacities, as well as different electronic applications. This application 450 or any of the cell and/or battery construction previously discussed could be made into a label format, for example. This could be easily done by somewhere in the process a pressure sensitive adhesive layer along with its release liner be placed on the back side of the application 450 or on the backside of any of the cell or battery constructions.

Figure 21:
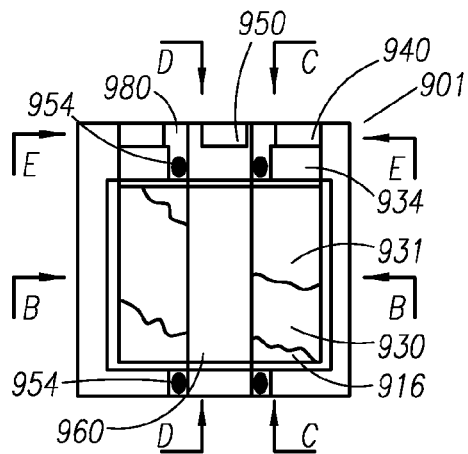
FIG. 21 shows a plan view of a unit cell 901.
Figure 22:
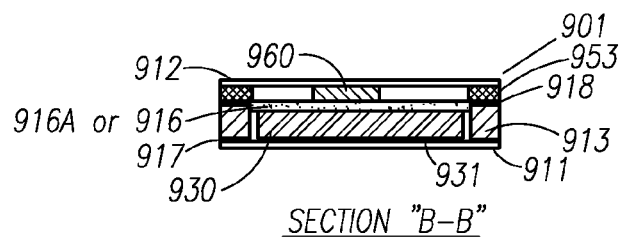
FIG. 22 shows a cross section view of the unit cell 901 taken through electrode areas.
Figure 23:
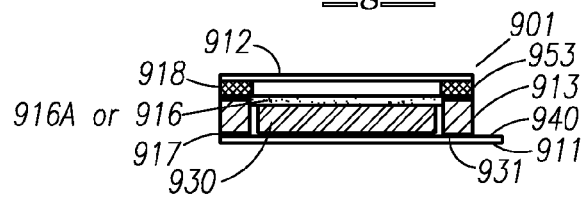
FIG. 23 shows a cross section view of the unit cell 901 taken through the entire length of the first electrode.
Figure 24:
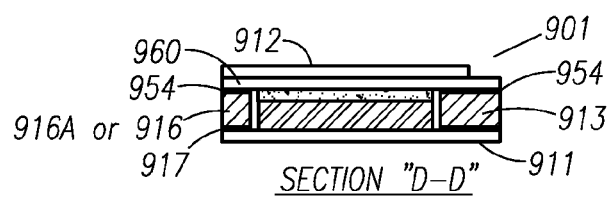
FIG. 24 shows a cross section view of the unit cell 901 taken through the entire length of the first and second electrode.
Figure 25:
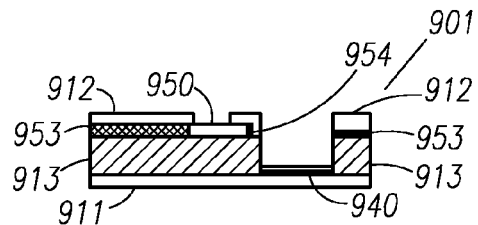
FIG. 25 shows a cross section view of the unit cell 901 taken through terminal contact areas.

It has been learned that the co-facial designs in the pouch construction have allowed for the thin printed cells/batteries to be capable of powering applications that need higher currents and/or higher capacities due to the lower internal resistance of the cells and a larger space available for the cathode. For this reason, the picture frame construction described in the previous paragraphs has been designed with an alternative construction in the same manner as was done for the pouch constructions described in the referenced application. For this reason, both the pouch as well as the picture frame constructions are capable of making both the "standard" co-planar as well as co-facial constructions. FIGS. 21-25 show embodiments of a completed unit cell 901 with a co-facial design in plan and sectional views. The cell 901 in this description is shown as though it was made on a high speed high volume printing press, but also could be made by hand or using semi-automatic methods for small numbers of cells, for example. For clarity purposes, cell 901 in FIG. 21 is shown without the top laminate 212.

The cell 901 of FIGS. 21-25 includes a top laminated film substrate layer 912, which for clarity purposes cell is not shown in FIG. 21, a lower laminated film substrate (layer) 911, with an extended area 980 which has a positive contact 940 and negative contact 950. The cell 901, shown in FIGS. 22 through 25, is comprised of electrode layer 930 (cathode) and electrode layer 960 (anode), each comprised of an electrochemical layer of a different composition that can interact in an electrochemical manner with an electrolyte to create an electrical current.

Prior to applying the cathode layer 930, a cathode collector 931 of highly conductive carbon can be printed on the lower laminated substrate 911. In at least one embodiment, this cathode collector has substantially the combined shape and size of the cathode layer 930, and contact extension 934, although size differences can also be utilized.

In at least one embodiment, on the large area part of the cathode collector 931, the cathode layer 930 is printed using an ink comprising Manganese dioxide, a conductor such as carbon and graphite, a binder, and water. After the cathode layer 930) is in place, along with the optional starch coating 916 or printable electrolyte, the bottom "picture frame" 913 is placed around the electrode. This picture frame could be made with a number of different materials and methods for a variety of embodiments (some of which are described herein). In the construction being discussed here, the picture frame 913 could comprise a die cut or laser cut polymer laminate sheet, such as a polyester, in the middle and having two outside layers of pressure sensitive adhesive (918 on the top surface and 917 on the bottom surface). The respective release liners are not shown (alternatively, this adhesive could be a printed heat sensitive material with a pattern that is similar to the PSA or flood coated prior the polymer being cut, for example).

The bottom adhesive layer 917 seals the bottom laminate substrate 911 to the picture frame 913. The top adhesive layer 918 is used to fasten the anode 960 zinc foil to the bottom picture frame 913. As previously discussed, the bottom picture frame 913 could be printed with dielectric type spacer material such as manufactured by Acheson Colloids of Port Huron, Mich. or EMC (Engineered Conductive Materials) of Delaware, Ohio, for example.

Prior to adding the anode zinc foil strip 960, a paper or absorbent type material separator 916A could be inserted into the bottom picture frame 913 and on top of cathode 930, if a printable starch and/or a printable electrolyte is not used. Also prior to adding the anode 960, a heat sensitive or pressure sensitive sealing/caulking material 954 could be printed at the anode location on top of bottom spacer 913.

After the anode strip 960 is placed on top of the bottom spacer 913 at the location of the heat sensitive or pressure sealing/caulking material 954, the thin top spacer 953 is printed over the bottom spacer 913 and anode 960 is printed over the ends of anode 960 (location of adhesive 954) as well as over the entire bottom spacer 913. This spacer could be a UV cured dielectric that is a Pressure Sensitive Adhesive (PSA) such as PM 030 manufactured by Acheson Colloids of Port Huron Mich., for example.

If the cell construction contains a starch ink coating or an absorbent type separator on the cathode, an aqueous electrolyte is added to this layer.

The cell is then completed by applying the top laminate substrate 912 over the top picture frame layer 953. If the top picture frame layer is not a PSA, then prior to applying this top laminate, the release liner of its pressure sensitive adhesive (not shown), if used, is removed from the top laminate 912. If the thin top picture frame 953 is a heat sensitive adhesive, then the top laminate 912 is heat sealed to picture frame 953. At the location of negative contact 950, the top laminate is notched to allow access to the negative terminal.

Figure 26:
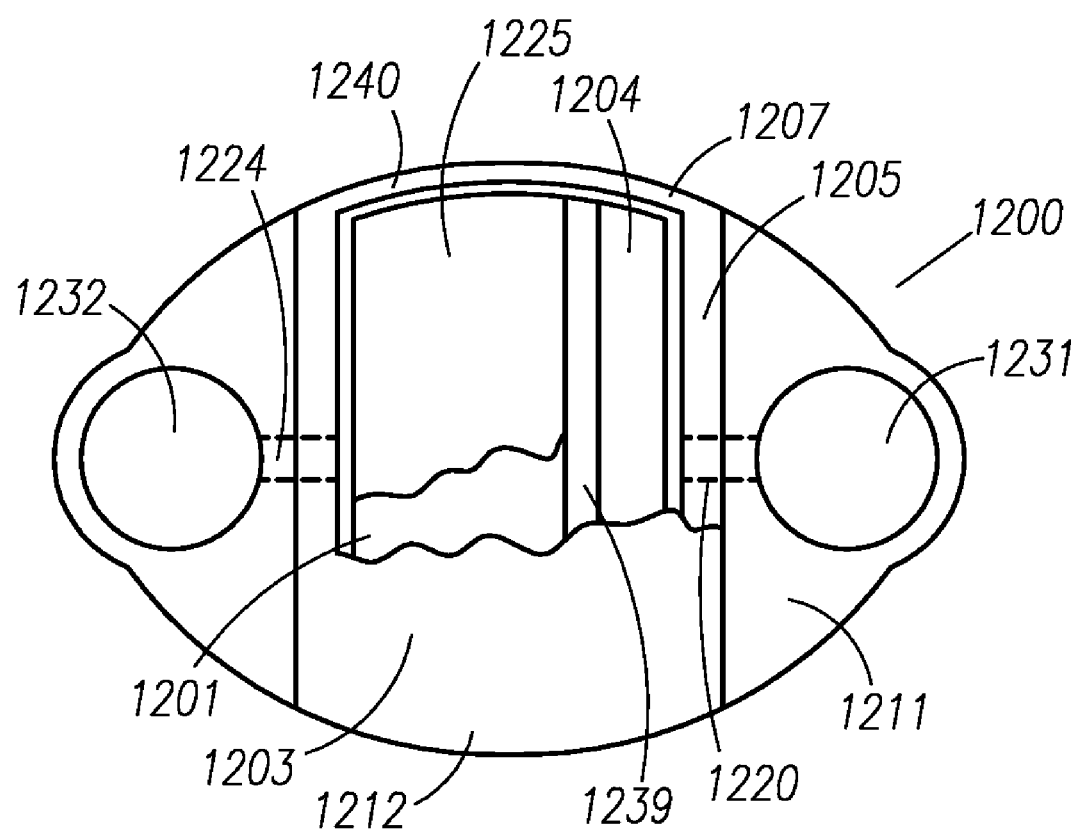
FIG. 26 shows a plan view of a unit cell 1200.

The previous examples described a picture frame cell/battery construction using, for example, a rectilinear geometry. In most cases, that would probably be the geometry of choice; however, by using the picture frame construction, geometries are not limited to being rectilinear. For example, the battery could be used in a medical device, such as, for example, for wound care applications. A preferred geometry for some type of skin patch to allow skin wounds to heal better and faster may be circular or ovular and/or a combination of rectangles and circles. An example of this application 1200 is shown in FIG. 26. The negative skin patch electrode 1231 is at one end of the patch while the positive electrode 1232 is at the other end. In the middle of this ovular shaped patch is, for example, a 1.5 volt cell 1203 made with a picture frame construction. This cell, with a partial cutaway to show the cell internal parts, includes the following:

As has been discussed in the previous paragraphs, a non rectilinear cell can use the same parts and the same materials but with different geometries. The bottom substrate supports both the skin electrodes as well as the unit cell 1203. On substrate 1211, the cathode collector 1201 is printed first, then the zinc anode is 1204 is printed or laminated to the substrate as a foil/adhesive laminate. It can be made wider than in the other applications so that the cell seal 1205 under the picture frame 1207 can be in its length direction. Picture frame 1207 will be printed after the conductive negative contact 1220 is printed from the zinc anode 1204 to the negative skin electrode 1231. In the same printing station, the positive contact 1221 is printed to connect the cathode collector 1201 to the skin patch 1232. After all of these items are in place, then sealant 1240 is printed in a pattern similar to the picture frame 1207, or just over the cathode contact connector 1221 and over part of anode 1204.

This operation is followed by the printing of cathode 1225 and picture frame 1207. As in the previous constructions, it is preferred to print and or to add the electrolyte 1240 in the form of a viscous liquid (such as a flowable gel) which will cover both the anode 1204 and the cathode 1225 as well as the gap 1239 between the anode 1204 and cathode 1225. The cell is then completed when the top laminate 1212 seals the entire cell. This substrate could be a precut layer or a continuous film that is die cut after its application in the shape of frame 1207. The top layer is sealed with a pressure sensitive or heat sensitive adhesive on the film or on top of the picture frame 1207.

Thin printed flexible cells/batteries have many potential applications. These can include one or more of the following general categories as examples:
1. Advertising and promotion;
2. Toys, novelties, books, greeting cards, and games;
3. Inventory tracking and control such as (smart RFID tags);
4. Security tags;
5. Condition indicators such as temperature, humidity, etc.;
6. Iontophoretic applications for pharmaceuticals and/or cosmetics; and
7. Healthcare products such as smart diapers, incontinence products, etc.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:
1. A flat electrochemical cell for generating an electrical current, comprising:
   a first substrate layer comprising a plurality of laminated layers including a first oxide barrier layer having a gas transmission rate that permits gas to escape through said plurality of laminated layers of the first substrate layer;
   a second substrate layer;
   a cathode layer provided on said first substrate layer or said second substrate layer;
   an anode layer provided on the same of said first substrate layer and said second substrate layer as said cathode layer, said anode layer and said cathode layer thereby being arranged substantially co-planar;
   a liquid electrolyte in contact with said cathode layer and also in contact with said anode layer; and
   said first substrate layer being connected to said second substrate layer to form an inner space containing said electrolyte, wherein
   at least one of said anode layer and said cathode layer is formed of a cured or dried ink.

2. The electrochemical cell of claim 1, further comprising a cathode current collector disposed between said cathode layer and the substrate on which the cathode layer is provided.

3. The electrochemical cell of claim 2, further comprising an anode current collector disposed between said anode layer and the substrate on which the anode layer is provided.

4. The electrochemical cell of claim 1, said second substrate layer comprising a plurality of laminated layers including a second oxide barrier layer having a gas transmission rate that permits gas to escape through said plurality of laminated layers of the second substrate layer.

5. The electrochemical cell of claim 1, said electrolyte being a gel electrolyte.

6. The electrochemical cell of claim 1, further comprising a soak up separator soaked with said electrolyte and in contact with both said anode layer and said cathode layer in said inner space.

7. The electrochemical cell of claim 1, said first oxide barrier layer being effective to prevent substantial moisture transmission therethrough.

8. The electrochemical cell of claim 1, said first substrate layer and second substrate layer being connected via a frame disposed therebetween.

9. The electrochemical cell of claim 8, said frame comprising a cured or dried adhesive ink.

10. The electrochemical cell of claim 1, said cathode layer being printed from an aqueous composition comprising about 20-60% manganese dioxide, about 2-25% graphite and about 0.5%-15% of an aqueous solution of comprising about 20-60% polyvinylpyrrolidone and about 0.1-20% of distilled water to provide a dry lay down weight of about 0.03-0.25 grams per square inch.

11. The electrochemical cell of claim 2, said cathode current collector comprising a cured or dried ink printed on said substrate, said cathode comprising a cured or dried ink printed on said cathode current collector.

12. The electrochemical cell of claim 11, said cathode collector layer being printed from a different ink than said cathode layer.

13. The electrochemical cell of claim 1, said first substrate layer further comprising a first heat sealing layer.

14. The electrochemical cell of claim 13, said second substrate layer further comprising a second heat sealing layer.

15. The electrochemical cell of claim 1, each of said anode layer and said cathode layer being formed of a cured or dried ink.

16. The electrochemical cell of claim 1, said cathode layer being printed from an aqueous composition comprising manganese dioxide, graphite and hydroxyl-ethyl cellulose.

17. The electrochemical cell of claim 1, said oxide barrier layer being selected such that its barrier properties are configured to provide a desired gas transmission rate corresponding to a specific application or environment during use.

18. The electrochemical cell of claim 17, said barrier properties being configured to provide a desired gas transmission rate corresponding to a hot, dry environment such that said barrier layer exhibits a low transmission rate to prevent substantial moisture loss from said cell.

19. The electrochemical cell of claim 13, said first substrate layer further comprising a first structural layer whose thickness is selected such that the first substrate layer's material properties are configured to provide a desired structural strength corresponding to a specific application or environment during use.

20. The electrochemical cell of claim 1, said cell having a non-rectangular shape.

21. A battery comprising a plurality of electrochemical cells according to claim 1.

* * * * *